(12) United States Patent
Kilian et al.

(10) Patent No.: US 11,792,853 B2
(45) Date of Patent: Oct. 17, 2023

(54) BIDIRECTIONAL SCHEDULING IN LOW-POWER WIDE-AREA NETWORKS

(71) Applicant: Fraunhofer-Gesellschaft zur Foerderung der angewandten Forschung e.V., Munich (DE)

(72) Inventors: Gerd Kilian, Erlangen (DE); Josef Bernhard, Erlangen (DE); Johannes Wechsler, Erlangen (DE); Jakob Kneissl, Erlangen (DE); Stefan Ereth, Erlangen (DE); Dominik Soller, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 253 days.

(21) Appl. No.: 17/351,025

(22) Filed: Jun. 17, 2021

(65) Prior Publication Data

US 2021/0315013 A1   Oct. 7, 2021

Related U.S. Application Data

(63) Continuation of application No. PCT/EP2019/086108, filed on Dec. 18, 2019.

(51) Int. Cl.
*H04W 74/08* (2009.01)
*H04L 5/00* (2006.01)

(52) U.S. Cl.
CPC ....... *H04W 74/0816* (2013.01); *H04L 5/0044* (2013.01)

(58) Field of Classification Search
CPC .............. H04W 74/0816; H04W 72/04; H04L 5/0044; H04L 27/26; H04L 47/365;
(Continued)

(56) References Cited

U.S. PATENT DOCUMENTS

2005/0141596 A1   6/2005   Black et al.
2014/0176341 A1   6/2014   Bernhard et al.
(Continued)

FOREIGN PATENT DOCUMENTS

CN   109963319 A   *   7/2019   ........... H04L 5/0048
DE   102011082098 A1   3/2013
(Continued)

OTHER PUBLICATIONS

Maciej Muhleisen: "IEEE 802.16 Coexistence through Regular Channel Occupation" European Wireless Conference pp. 211-215, May 1, 2009 (Year: 2009).*
(Continued)

*Primary Examiner* — Ayaz R Sheikh
*Assistant Examiner* — Louis Samara
(74) *Attorney, Agent, or Firm* — Perkins Coie LLP; Michael A. Glenn

(57) ABSTRACT

Embodiments provide a base station of an uncoordinated wireless communication system, wherein the communication system is configured to communicate in a radio band used by a plurality of communication systems, wherein the base station is configured to receive an uplink transmission from an end point of the wireless communication system, wherein the base station is configured to transmit, in response to the reception of the uplink transmission, a downlink transmission to the end point in a downlink transmission window, wherein the downlink transmission window is synchronized in time to the uplink transmission, wherein the base station is configured, in case of an expected collision of the downlink transmission with another transmission, to reposition the downlink transmission in time and/or frequency within the downlink transmission window, in order to avoid a collision of the downlink transmission with the other transmission.

49 Claims, 10 Drawing Sheets

(58) Field of Classification Search
CPC ..... H04L 47/41; H04L 1/1812; H04L 5/0048; H04L 5/00; H04B 7/0695
See application file for complete search history.

(56) References Cited

U.S. PATENT DOCUMENTS

| | | | |
|---|---|---|---|
| 2016/0219505 A1 | 7/2016 | Subramanian et al. | |
| 2017/0019927 A1* | 1/2017 | Kim | H04W 72/04 |
| 2019/0036833 A1* | 1/2019 | Bernhard | H04L 47/41 |
| 2019/0036834 A1* | 1/2019 | Bernhard | H04L 47/365 |
| 2021/0242988 A1* | 8/2021 | Kwak | H04L 27/26 |

FOREIGN PATENT DOCUMENTS

| | | | |
|---|---|---|---|
| DE | 102016205052 A1 | 9/2017 | |
| DE | 102016205054 A1 | 9/2017 | |
| ES | 2925776 T3 * | 10/2022 | H04L 1/1812 |
| KR | 20180082572 A * | 7/2018 | |
| KR | 20180112214 A * | 10/2018 | |
| KR | 20190114404 A * | 10/2019 | |
| WO | 2017162740 A1 | 9/2017 | |
| WO | 2018101874 A1 | 6/2018 | |
| WO | WO-2018120987 A1 * | 7/2018 | H04L 5/00 |
| WO | 2018183789 A1 | 10/2018 | |
| WO | WO-2019032882 A1 * | 2/2019 | H04B 7/0695 |

OTHER PUBLICATIONS

"Short Range Devices; Low Throughput Networks (LTN); Protocols for radio interface A", ETSI 103 357 TS-UNB, Jun. 2018.

* cited by examiner

BIDIRECTIONAL SCHEDULING IN LOW-POWER WIDE-AREA NETWORKS

CROSS-REFERENCES TO RELATED APPLICATIONS

This application is a continuation of copending International Application No. PCT/EP2019/086108, filed Dec. 18, 2019, which is incorporated herein by reference in its entirety, and additionally claims priority from German Applications Nos. DE 10 2018 222 846.9, filed Dec. 21, 2018, which is incorporated herein by reference in its entirety.

BACKGROUND OF THE INVENTION

Embodiments relate to a base station and an end point of a low-power wide-area network, and more specifically, to downlink transmission collision avoidance in a low-power wide-area network. Some embodiments relate to bidirectional scheduling in low-power wide-area networks.

In unsynchronized LPWAN (LPWAN=low-power wide-area network) systems one way to realize bidirectional communication is to use a specified offset between uplink and downlink transmissions [4]. End points can start uplink transmissions at any time without requiring coordination. At the specified offset after an uplink transmission, the end point starts receiving to allow a base station to transmit a downlink transmission (downlink message). End points only activate to receive downlink transmissions (downlink messages) in these downlink windows after preceding uplink transmissions to save power and achieve battery runtimes of many years. FIG. 1 provides an overview of such an uplink/downlink transmission cycle.

In detail, FIG. 1 shows in a diagram a schematic view of a bidirectional communication in asynchronous LPWAN systems between a base station 10 and an end point 12. Thereby, the ordinate denotes the base station 10 and end point 12, wherein the abscissa denotes the time.

As shown in FIG. 1, the end point 12 starts an uplink transmission 14 at a random point of time, e.g., when uplink data to be transmitted is available. The time during which the end point 12 transmits the uplink transmission 14 can be denoted as uplink window 16. After a predefined time offset 18 (known to base station 10 and end point 12) after the uplink transmission 14 (or the uplink transmission window 16), the end points opens a downlink transmission window 20, in which the end point 12 listens for transmissions from the base station 10. Thus, the downlink transmission window 20 can be used from the base station 10 for a downlink transmission 22. Before, after and between the uplink and downlink transmission windows 16 and 20, the end point 12 sleeps to save energy, e.g., for improving battery life.

From FIG. 1 it follows, that the opportunities to deliver downlink messages are limited and the timeframes are dictated by the typically uncoordinated end points. With many end points present in a network it is likely for downlink windows to overlap. To still enable as many successful downlink message deliveries as possible, the network might try to modify the downlink messages and/or rearrange the schedule to avoid conflicts between downlink transmissions while still matching the downlink windows provided by the end points.

When Telegram Splitting [1] is used, different patterns for the sub-data packets of transmissions in combination with different frequency offsets can reduce collisions between different transmissions. Usually, only some sub-data packets of two concurrent transmissions collide in this case. As described in [2] and [3], sub-data packets can be removed from the transmission in this case, while the transmission can still be recovered by the recipient. In this case, the selection of omitted sub-data packets should be optimized according to the requirements and priorities of the system.

Other factors to consider for downlink communication are regulatory constrains for base stations. In license free bands, the duty cycle of a transmitter is usually limited to avoid congestion of the band by a single user. The allowed duty cycle might also be dependent on the transmission power or scheme. This makes the base station duty cycle a bottleneck for downlink communication in a LPWAN setup with many end points and few base stations. Thus, the available duty cycles for base stations should be used in the most efficient way to maximize downlink capacity of the network.

The basic principle of a downlink window at a specified time/frequency offset also creates the problem of scheduling downlink data. The data has to be available for transmission when the downlink window is due. It is desirable to allow a direct response or updated data to be provided in case of a received uplink. Depending on the system the backend though might not be able to respond within the timeframe of the offset between uplink and downlink under all conditions.

SUMMARY

An embodiment may have a base station of an uncoordinated wireless communication system, wherein the communication system is configured to communicate in a radio band used by a plurality of communication systems, wherein the base station is configured to receive an uplink transmission from an end point of the wireless communication system, wherein the base station is configured to transmit, in response to the reception of the uplink transmission, a downlink transmission to the end point in a downlink transmission window, wherein the downlink transmission window is synchronized in time to the uplink transmission, wherein the base station is configured, in case of an expected collision of the downlink transmission with another transmission, to reposition the downlink transmission in time and/or frequency within the downlink transmission window, in order to avoid a collision of the downlink transmission with the other transmission.

Another embodiment may have a method for operating a base station of an uncoordinated wireless communication system communicating in a radio band used by a plurality of communication systems, the method comprising: receiving an uplink transmission from an end point of the wireless communication system, transmitting, in response to the reception of the uplink transmission, a downlink transmission to the end point in a downlink transmission window, wherein the downlink transmission window is synchronized in time to the uplink transmission, wherein transmitting the downlink transmission comprises, in case of an expected collision of the downlink transmission with another transmission, repositioning the downlink transmission in time and/or frequency within the downlink transmission window, in order to avoid a collision of the downlink transmission with the other transmission.

Another embodiment may have a method for transmitting data in an uncoordinated wireless communication system communicating in a radio band used by a plurality of communication systems, the method comprising: transmitting a first uplink transmission between a first end point and a first base station of the wireless communication system, transmitting a second uplink transmission between a second end point and the first base station or a second base station of the wireless communication system, transmitting, in response to the transmission of the first uplink transmission, a first downlink transmission between the first base station and the first end point of the wireless communication system in a first downlink transmission window, transmitting, in response to the transmission of the second uplink transmission, a second downlink transmission between the first base station or the second base station and the second end point of the wireless communication system in a second downlink transmission window, and repositioning, in case of an expected collision of the first downlink transmission and the second downlink transmission, one or both of the first downlink transmission and the second downlink transmission in time and/or frequency within the respective downlink transmission window, in order to avoid a collision of the first downlink transmission and the second downlink transmission.

Another embodiment may have a non-transitory digital storage medium having a computer program stored thereon to perform the method for transmitting data in an uncoordinated wireless communication system communicating in a radio band used by a plurality of communication systems, the method comprising: transmitting a first uplink transmission between a first end point and a first base station of the wireless communication system, transmitting a second uplink transmission between a second end point and the first base station or a second base station of the wireless communication system, transmitting, in response to the transmission of the first uplink transmission, a first downlink transmission between the first base station and the first end point of the wireless communication system in a first downlink transmission window, transmitting, in response to the transmission of the second uplink transmission, a second downlink transmission between the first base station or the second base station and the second end point of the wireless communication system in a second downlink transmission window, and repositioning, in case of an expected collision of the first downlink transmission and the second downlink transmission, one or both of the first downlink transmission and the second downlink transmission in time and/or frequency within the respective downlink transmission window, in order to avoid a collision of the first downlink transmission and the second downlink transmission, when said computer program is run by a computer.

Embodiments provide a base station of an uncoordinated wireless communication system, wherein the base station is configured to receive an uplink transmission from an end point of the wireless communication system, wherein the base station is configured to transmit, in response to the reception of the uplink transmission, a downlink transmission to the end point in a downlink transmission window, wherein the downlink transmission window is synchronized in time to the uplink transmission [e.g., with a specific offset between the uplink transmission of the end point and the downlink transmission window], wherein the base station is configured, in case of an expected [e.g., probable] collision of the downlink transmission with another transmission [e.g., of the base station or another entity of the wireless communication system; or of another communication system], to reposition [e.g. shift] the downlink transmission in time and/or frequency [e.g., by applying a time and/or frequency offset to the downlink transmission] within the downlink transmission window, in order to avoid a collision of the downlink transmission with the other transmission.

In embodiments, the communication system is configured to communicate in a radio band [e.g. ISM radio band] used by a plurality of communication systems, In embodiments, the downlink transmission window is synchronized in frequency to the uplink transmission.

In embodiments, the base station is configured to estimate a collision probability of the downlink transmission with another transmission [e.g., based on previous reception conditions], in order to determine whether a collision of the downlink transmission with another transmission is expected.

For example, the base station can be configured to determine that a collision of the downlink transmission with another transmission is expected, if the collision probability exceeds a predefined threshold.

In embodiments, the base station is configured to obtain an information [e.g., via a side channel or from a previous uplink transmission or from a schedule of the base station itself] describing other planned transmissions of the communication system [e.g., of an end point, the base station or another base station], wherein the base station is configured to determine whether a collision of the downlink transmission with another transmission is expected based on the information describing planned transmissions of the communication system.

In embodiments, the downlink transmission window [e.g., bandwidth and/or length of the downlink transmission window] considers transmission tolerances [e.g., frequency deviations, time deviations, multipath propagation, and/or doppler shift] of the communication system [e.g., of the base station and/or end point].

For example, bandwidth and/or length [e.g., duration] of the transmission window can be designed to accommodate the downlink transmission considering transmission tolerances of the communication system.

In embodiments, the base station is configured to reposition [e.g. shift] the downlink transmission in time and/or frequency within the downlink transmission window, thereby exploiting remaining transmission tolerances of the communication system [e.g., still available tolerances covered by the transmission window after compensating part of the transmission tolerances at the base station side [e.g., oscillator tolerances]].

In embodiments, the downlink transmission window comprises [e.g., is separated into] a plurality of downlink transmission sub-windows [e.g., distributed in time and/or frequency [e.g., according to a time and/or frequency hopping pattern]], wherein the downlink transmission is a telegram splitting based downlink transmission that is transmitted non-concurrently in the plurality of downlink transmission sub-windows.

In embodiments, the downlink transmission comprises a plurality of sub-data packets [e.g., into which a data packet or telegram to be transmit is separated] that are transmitted non-concurrently in a plurality of downlink transmission sub-windows [e.g., distributed in time and/or frequency [e.g., according to a time and/or frequency hopping pattern]], wherein the base station is configured to reposition [e.g. shift] at least a subset of the plurality of sub-data packets of the downlink transmission in time and/or frequency within the plurality of downlink transmission sub-windows, in order to avoid a collision of the downlink transmission with the other transmission.

In embodiments, the base station is configured to reposition [e.g. shift] the plurality of sub-data packets uniformly in time and/or frequency within the downlink transmission sub-windows.

In embodiments, the base station is configured to reposition [e.g. shift] the plurality of sub-data packets within the downlink transmission sub-windows according to an emulated doppler shift on the downlink transmission between the base station and the end point.

For example, the base station can be configured to reposition [e.g. shift] the plurality of sub-data packets by applying time and/or frequency offsets to the plurality of data packets determined by emulating [or simulating] a doppler shift between the base station and the end point.

In embodiments, the base station is configured to reposition [e.g. shift] the plurality of sub-data packets within the downlink transmission sub-windows by applying time and/or frequency offsets to the plurality of sub-data packets or at least a subset of the plurality of sub-data packets.

In embodiments, the base station is configured to equalize the power of the transmissions of the plurality of sub-data packets.

In embodiments, the base station is configured to compensate a deviation in transmission power for different sub-data packets of the downlink transmission, caused by a different number of concurrent transmissions, by attenuating sub-data packet transmissions or parts of sub-data packet transmissions with a lower number of concurrent transmissions accordingly.

In embodiments, the base station is configured to re-allocate a second subset of the plurality of sub-data packets of the downlink transmission to other downlink transmission sub-windows [e.g. of a second downlink transmission window following the downlink transmission window] and to indicate in a first subset of the plurality of sub-data packets the other downlink transmission sub-windows to which the second subset of the plurality of sub-data packets are re-allocated [e.g., wherein the first subset and the second subset are disjoint; e.g., wherein the first subset are transmitted or planned to be transmitted before the second subset].

In embodiments, the base station is configured to re-allocate a second subset of the plurality of sub-data packets of the downlink transmission to other downlink transmission sub-windows, to align multiple transmissions for simultaneous transmission on different frequencies.

In embodiments, the plurality of sub-data packets are coded [e.g., channel coded] [e.g. such that only a subset of the plurality of sub-data packets are requirements to successfully decode the original data packet at a receiver side], wherein the base station is configured to not transmit a sub-data packet or a part of a sub-data packet of the plurality of sub-data packets, in order to avoid a collision of the downlink transmission [i.e. of the subset of the plurality of sub-data packets] with the other transmission.

In embodiments, the base station is configured to queue downlink data to be transmitted in the downlink transmission [e.g., to satisfy uplink/downlink timing requirements [e.g., when delays from the data source might be to high]].

In embodiments, the base station is configured to update or allow updating [e.g., by remote systems] the queued downlink data based on uplink data received with the [e.g. previous] uplink transmission.

In embodiments, the base station is configured to transmit the previously queued downlink data in the downlink transmission, if a timing constraint cannot be met for the updated downlink data.

In embodiments, the base station is configured to select downlink data to be transmitted in the downlink transmission from the queued downlink data in dependence on an expected collision of the respective downlink transmission having the respective downlink data and another transmission [e.g., of the base station or another entity of the wireless communication system; or of another communication system].

In embodiments, the base station is configured to [e.g., not transmit the downlink transmission and] request a further downlink transmission window if a transmission of the downlink transmission in the downlink transmission window is not possible due to collisions, duty cycle constraints and/or channel conditions.

In embodiments, the base station is configured, in case of an expected [e.g., probable] collision of the downlink transmission with another transmission [e.g., of the base station or another entity of the wireless communication system], to only transmit portions of the downlink transmission that positively correlate with the other transmission.

Embodiments provide a method for operating a base station [e.g., of an uncoordinated wireless communication system communicating in a radio band [e.g. ISM radio band] used by a plurality of communication systems]. The method comprises a step of receiving an uplink transmission from an end point of the wireless communication system. Further, the method comprises a step of transmitting, in response to the reception of the uplink transmission, a downlink transmission to the end point in a downlink transmission window, wherein the downlink transmission window is synchronized in time to the uplink transmission [e.g., with a specific offset between the uplink transmission of the end point and the downlink transmission window], wherein transmitting the downlink transmission comprises, in case of an expected [e.g., probable] collision of the downlink transmission with another transmission [e.g., of the base station or another entity of the wireless communication system; or of another communication system], to repositioning [e.g. shifting] the downlink transmission in time and/or frequency [e.g., by applying a time and/or frequency offset to the downlink transmission] within the downlink transmission window, in order to avoid a collision of the downlink transmission with the other transmission.

Embodiments provide a method for transmitting data [e.g., in an uncoordinated wireless communication system communicating in a radio band [e.g. ISM radio band] used by a plurality of communication systems]. The method comprises a step of transmitting a first uplink transmission between a first end point and a first base station of the wireless communication system. Further, the method comprises a step of transmitting a second uplink transmission between a second end point and the first base station or a second base station of the wireless communication system. Further, the method comprises a step of transmitting in response to the transmission of the first uplink transmission, a first downlink transmission between the first base station and the first end point of the wireless communication system in a first downlink transmission window, [e.g., wherein the first downlink transmission window is synchronized in time and/or frequency [e.g., with a specific offset in between] to the first uplink transmission].

Further, the method comprises a step of transmitting, in response to the transmission of the second uplink transmission, a second downlink transmission between the first base station or the second base station and the second end point of the wireless communication system in a second downlink transmission window, [e.g., wherein the second downlink transmission window is synchronized in time and/or frequency [e.g., with a specific offset in between] to the second uplink transmission]. Further, the method comprises a step of repositioning [e.g., shifting], in case of an expected [e.g., probable] collision of the first downlink transmission and the second downlink transmission, one or both of the first downlink transmission and the second downlink transmission in time and/or frequency [e.g., by applying a time and/or frequency offset to the respective downlink transmission] within the respective downlink transmission window [e.g., prior or during transmission of the respective downlink transmission], in order to avoid a collision of the first downlink transmission and the second downlink transmission.

In embodiments, the method comprises determining whether a collision of the first downlink transmission and the second downlink transmission is expected based on an estimated collision probability describing a collision probability between the first downlink transmission and the second downlink transmission.

In embodiments, the method comprises determining whether a collision of the first downlink transmission and the second downlink transmission is expected based on an information [e.g., transmitted over a side channel of the communication system] describing a schedule [e.g., a time frequency schedule] of first downlink transmission and a schedule [e.g., a time frequency schedule] of the second downlink transmission.

In embodiments, the first downlink transmission window and the second downlink transmission window consider transmission tolerances of the communication system.

In embodiments, the respective downlink transmission is repositioned [e.g., shifted] in time and/or frequency within the respective downlink transmission window, thereby exploiting remaining transmission tolerances of the communication system [e.g., still available tolerances covered by the transmission window after compensating part of the transmission tolerances at the base station side [e.g., oscillator tolerances]].

In embodiments, the first downlink transmission is a telegram splitting based downlink transmission that is transmitted non-concurrently in a plurality of first downlink transmission sub-windows [e.g., which the first downlink window comprises or into which the first downlink window is separated], wherein the second downlink transmission is a telegram splitting based downlink transmission that is transmitted non-concurrently in a plurality of first downlink transmission sub-windows [e.g., which the first downlink window comprises or into which the first downlink window is separated].

In embodiments, the first downlink transmission comprises a plurality of first sub-data packets that are transmitted non-concurrently in a plurality of first downlink transmission sub-windows [e.g., distributed in time and/or frequency [e.g., according to a time and/or frequency hopping pattern]], wherein the second downlink transmission comprises a plurality of second sub-data packets that are transmitted non-concurrently in a plurality of second downlink transmission sub-windows [e.g., distributed in time and/or frequency [e.g., according to a time and/or frequency hopping pattern]].

In embodiments, repositioning [e.g. shifting] one or both of the first downlink transmission and the second downlink transmission comprises repositioning [e.g. shifting] the plurality of sub-data packets of the respective downlink transmission [e.g., of the first and/or second downlink transmission] uniformly in time and/or frequency within the respective downlink transmission sub-windows.

In embodiments, repositioning [e.g. shifting] one or both of the first downlink transmission and the second downlink transmission comprises repositioning [e.g. shifting] the plurality of sub-data packets of the respective downlink transmission [e.g., of the first and/or second downlink transmission] according to an emulated a doppler shift on the respective downlink transmission.

In embodiments, repositioning [e.g. shifting] one or both of the first downlink transmission and the second downlink transmission comprises applying time and/or frequency offsets to the plurality of sub-data packets of the respective downlink transmission [e.g., of the first and/or second downlink transmission].

In embodiments, both of the first downlink transmission and the second downlink transmission are repositioned [e.g., shifted], wherein opposite time and/or frequency offsets are applied to the sub-data packets of the first downlink transmission and the second downlink transmission.

In embodiments, the first plurality of sub-data packets and the second plurality of sub-data packets are coded, wherein one or more sub-data packets of the first downlink transmission and/or the second downlink transmission are not transmitted, in order to avoid a collision between the first downlink transmission and the second downlink transmission.

In embodiments, the method comprises determining a quality value for each of first downlink transmission and the second downlink transmission, the quality value describing an assumed reception quality of the respective downlink transmission, wherein the method comprises determining which sub-data packet of the first plurality of sub-data packets and/or the second plurality of sub-data packets is not transmitted based on the determined quality values in case of an expected collision between a sub-data packet of the first plurality of sub-data packets and a sub-data packet of the second plurality of sub-data packets.

In embodiments, the method comprises, in case there are two or more options [e.g., shifting sub-data packets and not transmitting one or more of the data packets] for avoiding a collision between the first downlink transmission and the second downlink transmission, calculating cost values for each of the two or more options for avoiding the collision between the first downlink transmission and the second downlink transmission, the cost value describing a perceived loss of the reception quality, and selecting the least expensive option.

In embodiments, the method comprises determining a quality value for each of first downlink transmission and the second downlink transmission, the quality value describing an assumed reception quality of the respective downlink transmission, wherein the method comprises updating the quality value for each of the first downlink transmission and the second downlink transmission after repositioning [e.g. shifting] the respective downlink transmission and/or removing one more sub-data packets of the respective downlink transmission, wherein the method comprises invalidating [e.g., canceling] the first downlink transmission or the second downlink transmission or at least the transmission of remaining sub-data packets of the respective downlink transmission, if the quality value of the respective downlink transmission falls below a predefined threshold.

In embodiments, the quality values of the first downlink transmission and the second downlink transmission are determined using channel quality information.

In embodiments, the quality values of the first downlink transmission and the second downlink transmission are adjusted [e.g., adapted] using a defined priority of the data of the respective downlink transmission.

In embodiments, the quality values of the first downlink transmission and the second downlink transmission are adjusted [e.g., adapted] using information about transmitter characteristics of the corresponding downlink transmission [e.g., transmitter characteristics of the base station] and/or receiver characteristics of the corresponding downlink transmission [e.g., receiver characteristics of the end point].

In embodiments, the quality values of the first downlink transmission and the second downlink transmission are updated based on feedback data [e.g. from the respective end points] describing the actual reception conditions.

In embodiments, the respective quality value is provided back to the source of the data transmitted with the respective downlink transmission [e.g., by the base station] after performing [e.g., finishing] the respective downlink transmission.

In embodiments, the method comprises distributing the first downlink transmission [e.g., the transmission of the first plurality of sub-data packets] over the first base station and the second base station or a third base station in dependence on transmission conditions [e.g., duty cycle, collisions] of the respective base station and/or transmission conditions [e.g., channel properties, coverage] between the respective base station and the end point.

In embodiments, the method comprises estimating attenuations and/or delays of portions of the first downlink transmission transmitted by the respective base stations, and adapting transmit powers and/or delays of the respective base stations for transmitting the respective portions of the first downlink transmission based on the estimated attenuations and/or delays.

In embodiments, the method further comprises receiving the first downlink transmission from the first end point further with the second base station or a third base station of the wireless communication system, and determining a position of the first end point based on transmission characteristics [e.g., attenuation, phase, time] of the first downlink transmission received at the first base station and the second base station or the third base station.

In embodiments, the method comprises determining a position of the first end point based on a position information transmitted with the first uplink transmission.

In embodiments, the method comprises transmitting the first downlink transmission using beamforming based on the determined position of the first end point.

Embodiments exploit downlink window tolerances to resolve downlink collisions.

Embodiments use a quality metric to improve (or even optimize) transmission adjustments and sub-data packet omissions.

Embodiments schedule and distribute transmissions to multiple base stations.

Embodiments coordinate multiple base stations to form a MIMO (MIMO=multiple-input multiple-output) setup.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
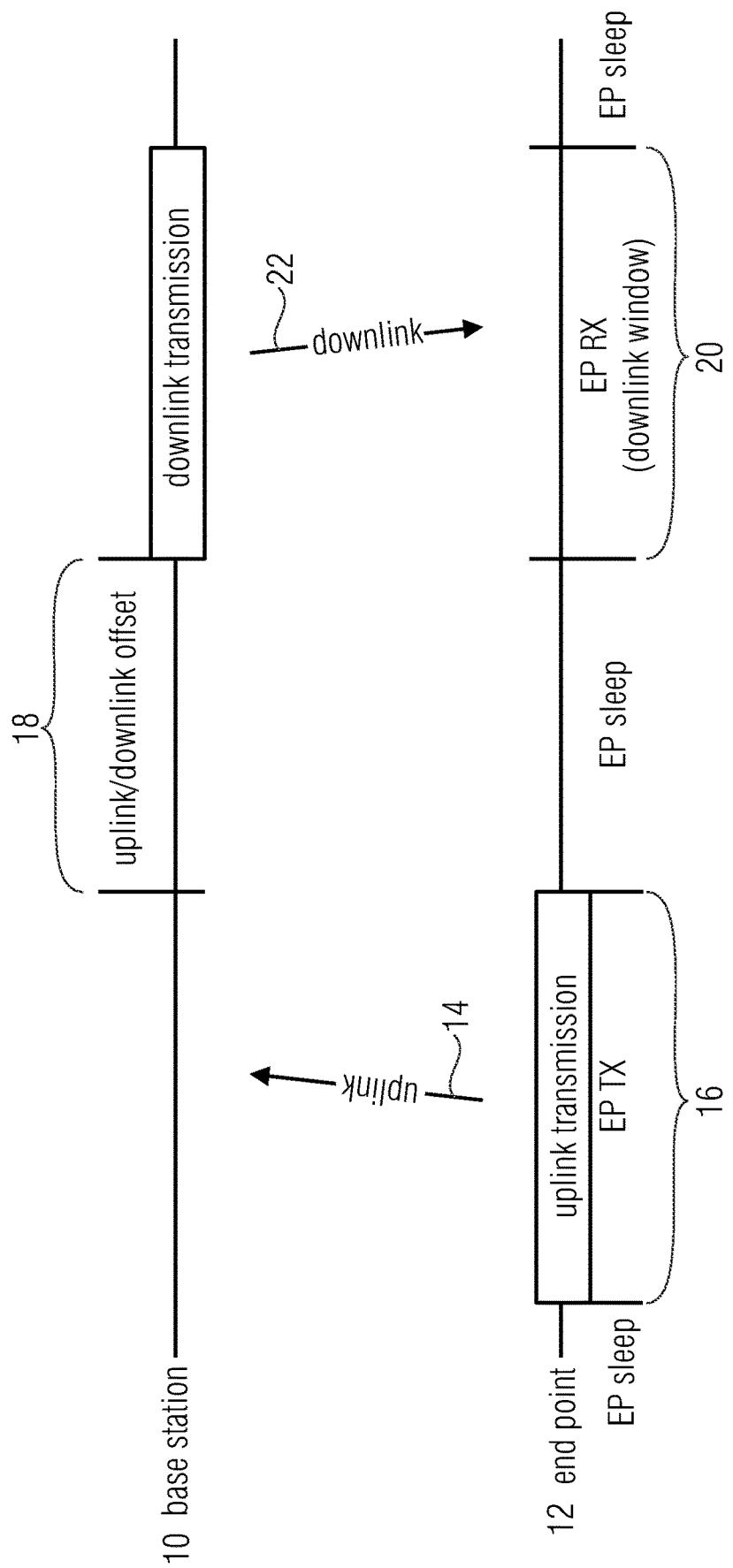
FIG. 1 shows in a diagram a schematic view of a bidirectional communication in asynchronous LPWAN systems between a base station and an end point.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 2:
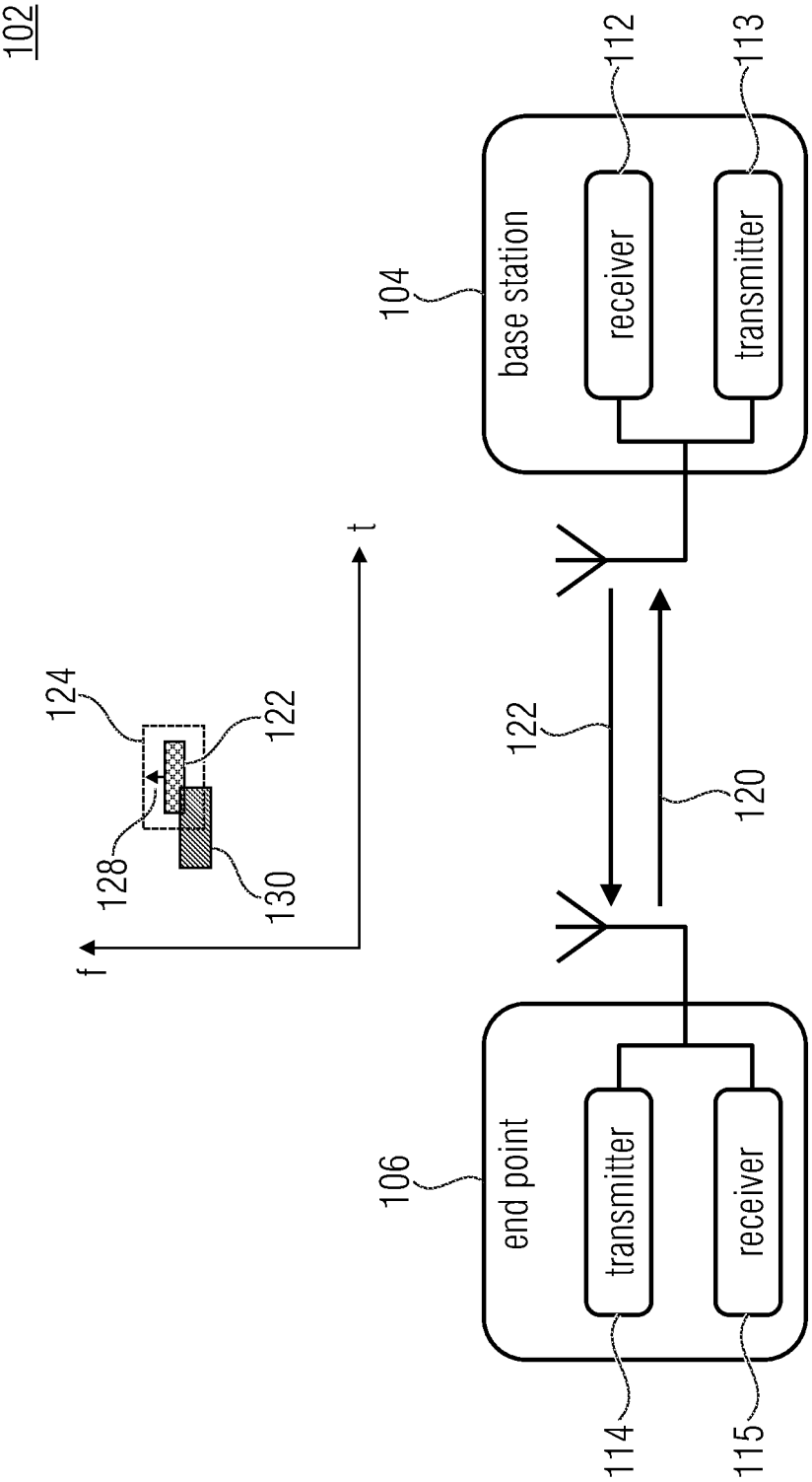
FIG. 2 shows a schematic block diagram of an uncoordinated (unsynchronized) wireless communication system, such as a low-power wide-area network, comprising a base station and at least one end point, according to an embodiment.

FIG. 2 shows a schematic block diagram of an uncoordinated (unsynchronized) wireless communication system 102, such as a low-power wide-area network, comprising a base station 104 and at least one end point 106.

The wireless communication system 102 uses a public, i.e., non-exclusive, frequency band (radio band), such as the ISM (ISM=industrial, scientific and medical) radio band, for transmitting data between the at least one end point 106 and the base station 104.

The end point 106 is configured to transmit at a random (arbitrary) point in time, e.g., in an uplink transmission window starting at a random (arbitrary) point in time, an uplink transmission 120.

The base station 104 is configured to receive the uplink transmission 120 from the end point 106 and to transmit, in response to the reception of the uplink transmission 120 from the end point 106, a downlink transmission 122 to the end point in a downlink transmission window 124, wherein the downlink transmission window 124 is synchronized in time (and optionally in frequency) to the uplink transmission 120, e.g., with a specific offset (e.g., time offset and optionally frequency offset) between the uplink transmission 120 of the end point 106 and the downlink transmission window 124.

Since the communication system 102 is unsynchronized (uncoordinated) and communicates in a radio band used by a plurality of communication systems, each potentially comprising a multiplicity of transmitters, the downlink transmission 122 may collide with another transmission 130, for example, a transmission from another communication system or a transmission of the same communication system 102, e.g., a transmission from another end point or another base station of the communication system 102 or even a transmission of the base station 104 itself (e.g., another downlink transmission responsive to an uplink transmission from another end point).

According to the concept of the present invention, in case of an expected (e.g., probable) collision of the downlink transmission 122 with another transmission 130, the downlink transmission 122 is repositioned (e.g. shifted) in time and/or frequency within the downlink transmission window, e.g., by applying a time and/or frequency offset to the downlink transmission 122, in order to avoid a collision of the downlink transmission 122 with the other transmission 130.

For example, as indicated in FIG. 2 by arrow 128, the base station 104 may shift the downlink transmission 122 by applying a (e.g., positive) frequency offset to the downlink transmission 122, in order to avoid a collision with the other transmission 130.

Due to system tolerances that have to be taken into account anyway by subscribers (i.e., end points and/or base stations) of the communication system 102, such as frequency deviations, time deviations, multipath propagation and/or doppler shift, a bandwidth and/or length (duration) of the downlink window 124, i.e. the bandwidth and/or timespan in which the end point 106 expects the downlink transmission, is greater than a bandwidth and/or transmission time actually needed by the downlink transmission 122, such that it is possible to reallocate the downlink transmission 122 within the downlink transmission window 124, in order to avoid a collision of the downlink transmission 122 with the other transmission 130.

Thus, by repositioning (e.g. shifting) the downlink transmission 122 in time and/or frequency within the downlink transmission window 124, the base station 104 may exploit remaining transmission tolerances of the communication system 102, e.g., still available tolerances covered by the transmission window 124 after compensating part of the transmission tolerances at the base station side, such as oscillator tolerances.

In embodiments, the base station 104 can be configured to estimate a collision probability of the downlink transmission 122 with another transmission 130, e.g., based on previous reception conditions, in order to determine whether a collision of the downlink transmission 122 with another transmission 130 is expected.

Alternatively (or additionally), the base station 104 can be configured to obtain an information, e.g., via a side channel or from a previous uplink transmission or from a schedule of the base station itself, describing other planned transmissions of the communication system 102, e.g., of an end point, the base station or another base station, wherein the base station 104 may determine whether a collision of the downlink transmission with another transmission 130 is expected based on the information describing planned transmissions of the communication system 102.

As shown by way of example in FIG. 2, the base station 104 can comprise a receiver 112 configured to receive signals from other subscribers of the communication system 102, such as the uplink transmission 120 from the end point 106, and a transmitter 113 configured to transmit signals to other subscribers of the communication system 102, such as the downlink transmission 122 to the end point 106.

Similarly, the end point 106 can comprise a transmitter 114 configured to transmit signals to other subscribers of the communication system 102, such as the uplink transmission 120, and a receiver 115 to receive signals from other subscribers of the communication system 102, such as the downlink transmission 122 from the base station.

In embodiments, the communication system 102 can be a telegram splitting [4] based communication system 102. In a telegram splitting based communication system, data to be transmitted between subscribers (e.g., end point 106 and base station 104) of the communication system 102, such as a data packet or telegram to be transmitted, is separated into a plurality of sub-data packets, each comprising only a part of the data to be transmitted, wherein the plurality of sub-data packets are transmitted non-concurrently according to a time and/or frequency hopping pattern. At a receiver side, the sub-data packets are combined to acquire the original data (e.g., the original data packet or telegram). Since the sub-data packets are coded, e.g., with a forwarded error correcting code, such as a convolutional code, only a subset of the sub-data packets are requirements at the receiver side (e.g., have to be successfully received) for acquiring the original data. Thus, a loss of some of the data packets due to collisions with other transmissions can be compensated.

Figure 3:
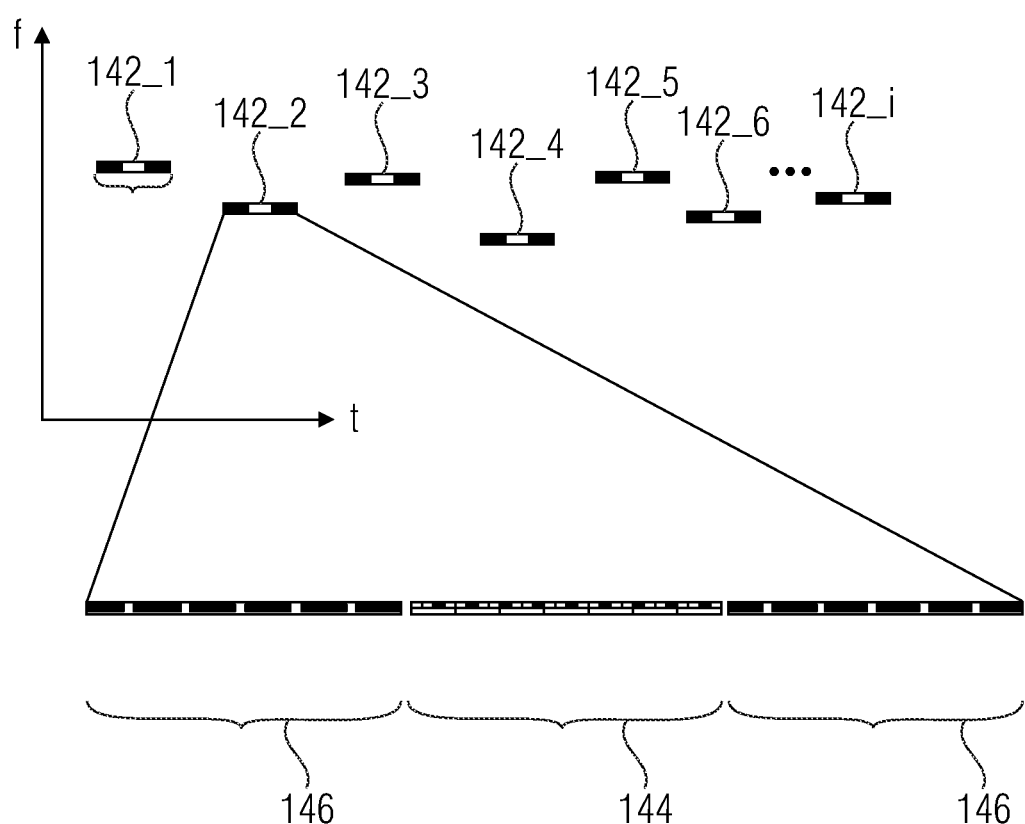
FIG. 3 shows in a diagram an occupation of a communication channel caused by a telegram splitting based transmission.

FIG. 3 shows in a diagram an occupation of a communication channel caused by a telegram splitting based transmission. Thereby, the ordinate denotes the frequency and the abscissa the time.

As shown in FIG. 3, when telegram splitting is used, data is transmitted using a plurality of sub-data packets $142\_1$ to $142\_i$ that are transmitted non-concurrently according to a time and/or frequency hopping pattern. Due to the separation of the plurality of sub-data packets $142\_1$ to $142\_i$ over time and/or frequency, another transmission or an interferer may only disturb some of the sub-data packets $142\_1$ to $142\_i$, such that the original data still can be recovered at a received side based on the remaining sub-data packets $142\_1$ to $142\_i$.

For detection/synchronization purposes, at least some of the sub-data packets $142\_1$ to $142\_i$ may comprise a pilot sequence (or synchronization sequence) as indicated in FIG. 3 by way of example by pilot symbols 144, which may be arranged between data symbols 146 or at any other position within the sub-data packets $142\_1$ to $142\_i$. The synchronization sequences included in the sub-data packets $142\_1$ to $142\_i$ can be synchronization sub-sequences, i.e. parts of a synchronization sequence that is separated over at least a part of the plurality of sub-data packets 142_1 to 142_i.

When telegram splitting is used for the downlink transmission 122 to the end point 106, the plurality of sub-data packets 142_1 to 142_i can be transmitted in a plurality of downlink transmission (sub-)windows. In other words, when telegram splitting is used for the downlink transmission 122 to the end point 106, the downlink transmission window 124 may comprise (or be separated into) a plurality of downlink transmission (sub-)windows that are distributed in time and/or frequency according to a time and/or frequency hopping pattern, wherein the plurality of sub-data packets are transmitted in the plurality of downlink transmission (sub-) windows, i.e. one sub-data packet per downlink transmission (sub-)window.

In embodiments, the downlink transmission 122 can comprise i sub-data packets 142_1 to 142_i, wherein i is a natural number greater than or equal to two, i≥2. In general, when telegram splitting is used for transmitting the downlink transmission 122, the downlink transmission can be separated into, for example, i=12, 18 or 24 sub-data packets 142_1 to 142_i.

Figure 4:
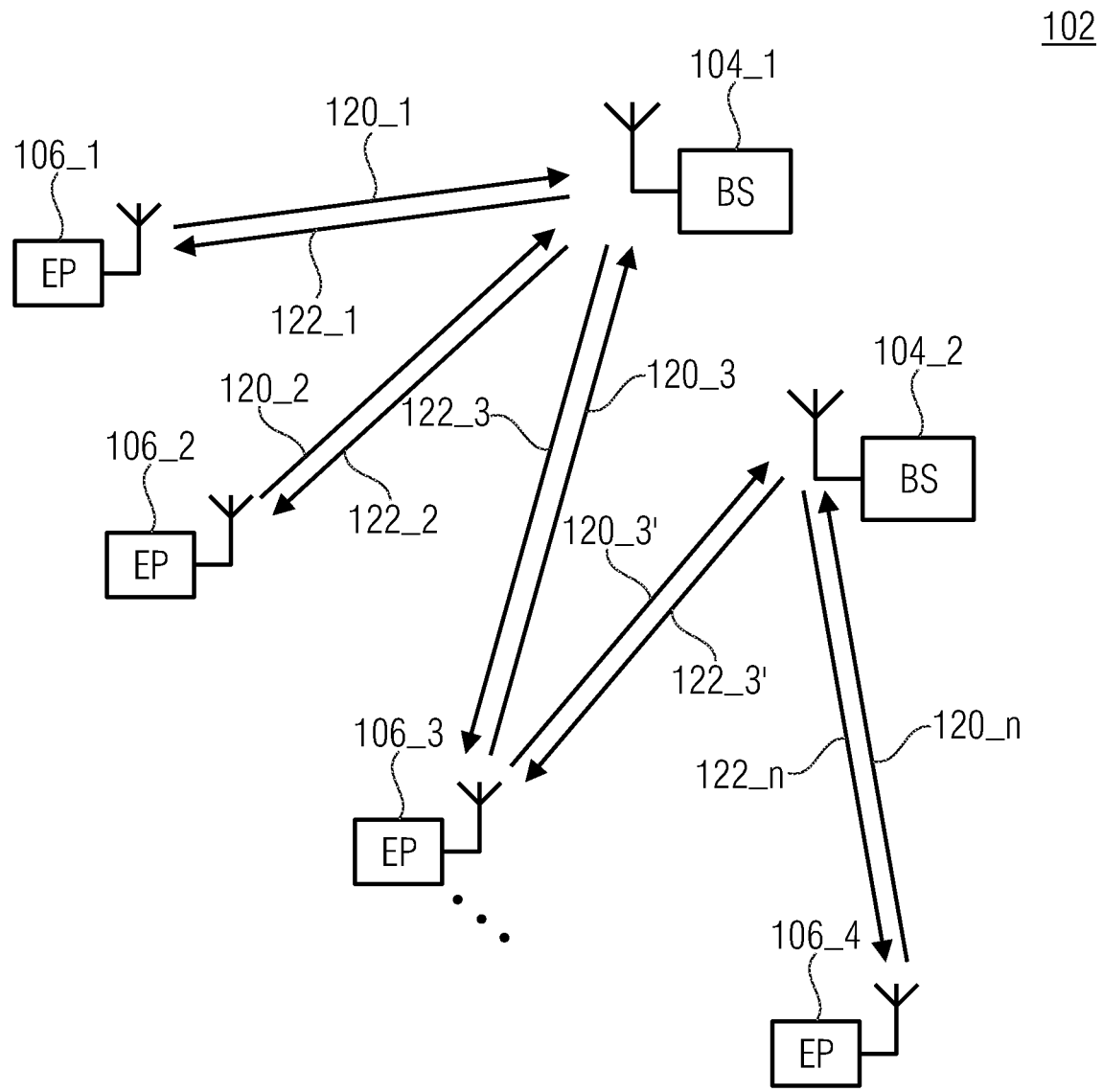
FIG. 4 shows a schematic block diagram of an uncoordinated (unsynchronized) wireless communication system, comprising a plurality of end points and one or more base stations, according to an embodiment.

Although the above embodiments made reference primarily to a communication system 102 comprising one end point 106 and one base station 104 for illustration purposes, the communication system 102 in general may comprise a plurality of end points and possibly more than one base station, as will become clear from the discussion of FIG. 4.

FIG. 4 shows a schematic block diagram of an uncoordinated (unsynchronized) wireless communication system 102, comprising a plurality of end points 106_1 to 106_n and one or more base stations 104_1 to 104_2.

The communication system 102 may comprise n end points 106_1 to 106_n, wherein n is a natural number greater than or equal to two, n≥2, such as 10, 100, 1.000, 10.000 or possibly even 100.000 end points. Further, the communication system 102 may comprise one or more base stations, such as two base stations 104_1 and 104_2 as shown by way of example in FIG. 4. However, the communication system 102 also may comprise more than two base stations.

Each of the base stations 104_1 and 104_2 may communicate with some or all of the plurality of end points 106_1 to 106_n. For example, the first base station 104_1 can transmit, in response to a reception of a first uplink transmission 120_1 from the first end point 106_1, a first downlink transmission 122_1 to the first end point 106_1. Further, the first base station 104_1 can transmit, in response to a reception of a second uplink transmission 120_2 from the second end point 106_2, a second downlink transmission 122_2 to the second end point 106_2. Further, the first base station 104_1 can transmit, in response to a reception of a third uplink transmission 120_3 from the third end point 106_3, a third downlink transmission 122_3 to the third end point 106_3. Similarly, it is possible that the second base station 104_2 receives the third uplink transmission 120_3' from the third end point 106_3 and transmits, in response to the reception of the third uplink transmission 120_3', a third downlink transmission 122_3' to the third end point 106_3. Further, the second base station 104_2 can transmit, in response to a reception of a n-th uplink transmission 120_n from the n-th end point 106_n, a n-th downlink transmission 122_n to the n-th end point 106_n.

Subsequently, embodiments of the end point, base station and communication system are described in further detail.

1. Downlink Window Tolerances

Figure 5:
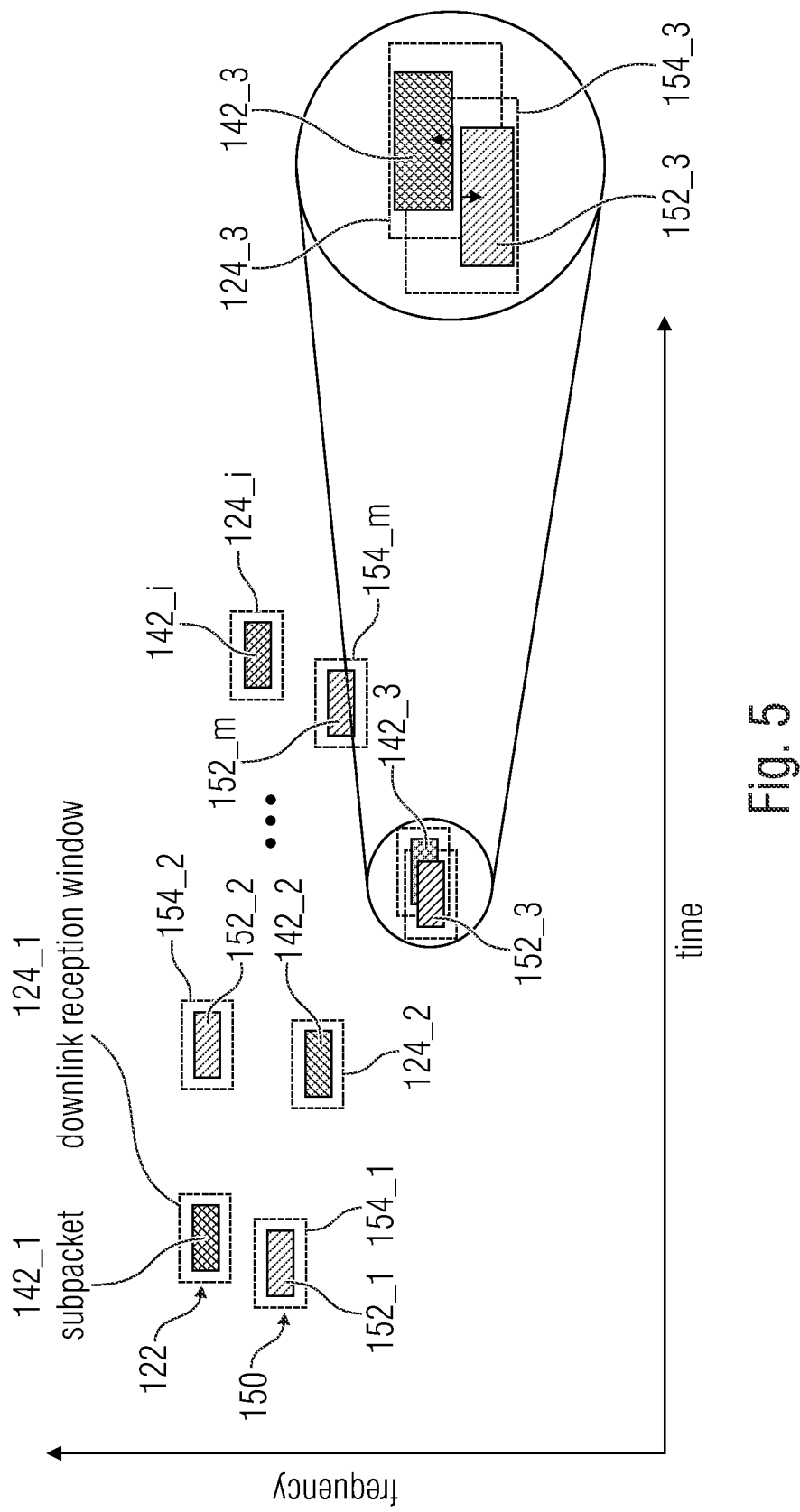
FIG. 5 shows in a diagram an occupation of a communication channel caused by a downlink transmission comprising a plurality of sub-data packets that are transmitted in a plurality of downlink transmission sub-windows and another transmission that collides with the downlink transmission.

FIG. 5 shows in a diagram an occupation of a communication channel (or a (portion) of the radio band) induced by a downlink transmission 122 comprising a plurality of sub-data packets 142_1 to 142_i that are transmitted in a plurality of downlink transmission (sub-)windows (e.g., downlink reception widows) 124_1 to 124_i and another transmission 150 that collides with the downlink transmission 122. Thereby, the ordinate denotes the frequency and the abscissa the time. In other words, FIG. 5 shows in a diagram a resolution of collisions between transmissions 122 and 150 by exploiting reception window tolerances.

As shown in FIG. 5 by way of example, the other transmission 150 also may comprise a plurality of sub-data packets 152_1 to 152_m that are transmitted in a plurality of downlink transmission windows 154_1 to 154_m. Thus, the other transmission 150 also might be a downlink transmission, e.g. of the same base station 104_1 or another base station 104_2, or possibly an uplink transmission from another of the end points 106_2 to 106_n. For example, referring to FIG. 4, the downlink transmission 122 can be a first downlink transmission 122_1 from the first base station 104_1 to the first end point 106_1, wherein the other transmission 150 can be a second downlink transmission 122_2 from the first base station 104_1 to the second end point 106_3 (or alternatively, a n-th downlink transmission 122_n from the second base station 104_2 to the n-th end point 106_n).

When two or more scheduled sub-data packets (e.g., sub-data packets 142_3 and 152_3) overlap at least partially in transmission time and frequency (or just time if the transmitter (e.g., base station 104_1) cannot transmit on multiple frequencies simultaneously), the collision might be resolved by altering the transmissions 122, 150 within the constraints of the according downlink windows (e.g., downlink transmission (sub-)windows 124_3 and 154_3).

The downlink receiver (e.g., end point 106_1) is expecting the transmission in a certain timeframe and frequency, this window (=downlink transmission (or reception) (sub-)window) might allow some deviation to compensate for oscillator tolerances, Doppler shift, path delays, etc. If these tolerances and actual conditions are known to the transmitter (e.g., base station 104_1) at least partially, a portion of the tolerances can be used to reposition the (downlink) transmission 122 within the time and/or frequency domain in order to avoid or reduce the overlap with other transmissions 150 as illustrated in FIG. 5. In other words, if the transmitter (e.g., base station 104_1) knows or at least assumes, that certain reception requirements are exceeded at the receiver (e.g., end point 106_1), it can exploit the remaining tolerances towards the systems or recipients design limits to gain more freedom in shaping the (downlink) transmission 122. The information about actual or expected conditions might either be retrieved via a side-channel or extracted from previous uplink data (of a previous uplink transmission) or reception conditions.

For example, a receiver (e.g., end point 106_1) might be capable of compensating a certain mobility induced Doppler shift or change in Doppler shift (acceleration in respect to the transmitter). If the transmitter (e.g., base station 104_1) has information about the actual mobility of the receiver (e.g., end point 106_1), it can utilize the headroom to emulate a Doppler shift or change in Doppler shift by manipulating the downlink transmission 122 within the frequency domain. Specifically, end points 106_1 to 106_n might be designed to operate in road vehicles while the actual end point 106_1 is known to be stationary or located, for example, on a large ship and thus will not experience significant acceleration. Likewise, if the path delay to the end point 106_1 is known to be shorter than the maximum allowed delay, the (downlink) transmission 122 can be delayed within the additional margin. Oscillator tolerances might be compensated by the (communication) system 102 anyway though remaining tolerances can also be used for collision avoidance.

In embodiments, remaining system tolerances are used to reposition (downlink) transmissions 122 in the time and/or frequency domain in order to reduce collisions with other transmissions 150.

To maintain the consistency between the sub-data packets 142_1 to 142_i of a (downlink) transmission 122, all sub-data packets 142_1 to 142_i might be adapted in accordance with the adaptation done to the conflicting sub-data packet (e.g., sub-data packet 142_3). Specifically, if one sub-data packet (e.g., sub-data packet 142_3) is shifted, all remaining sub-data packets (e.g., sub-data packets 142_1 to 142_2 and 142_4 to 142_i) of the (downlink) transmission 122 might be shifted as shown in FIG. 6.

Figure 6:
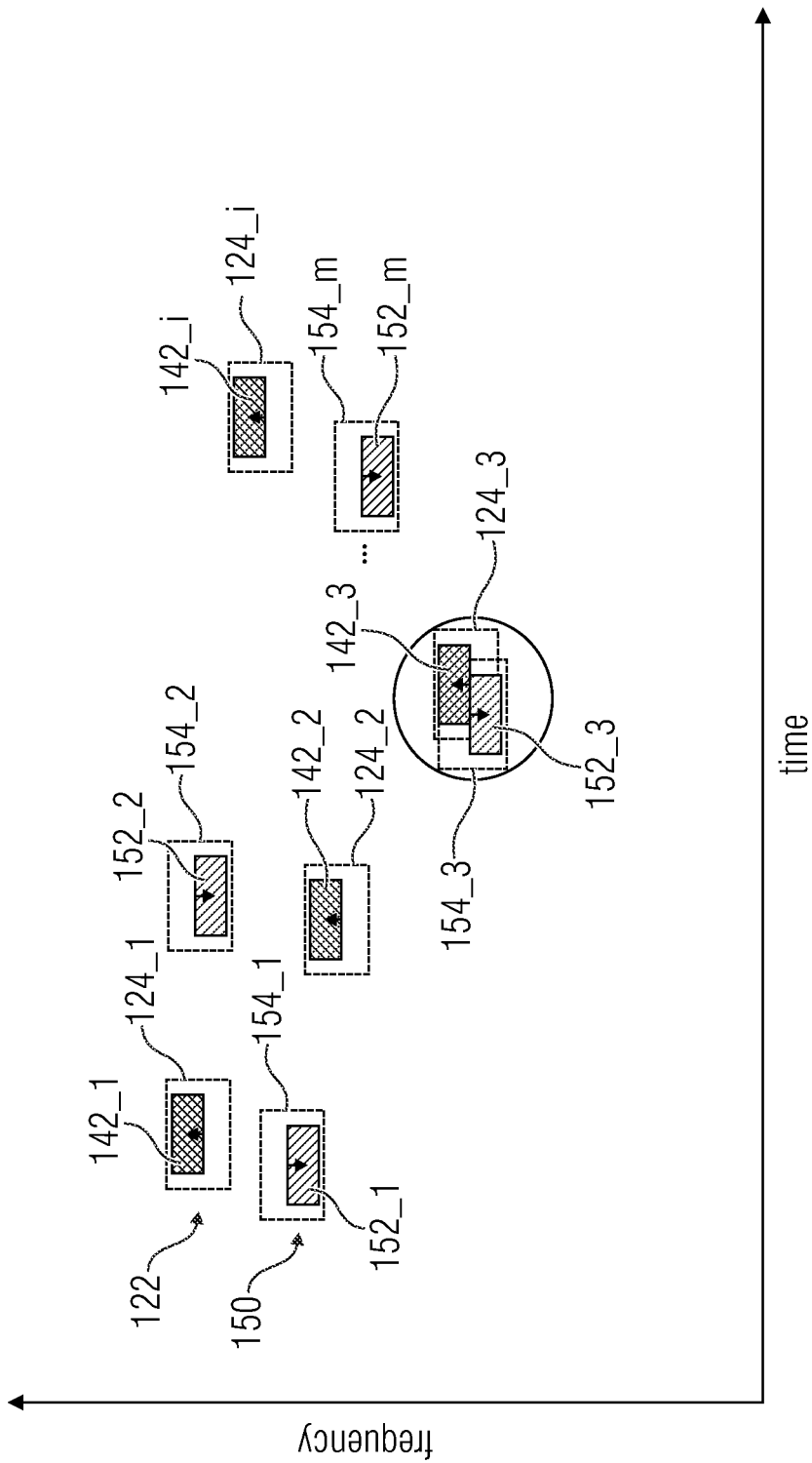
FIG. 6 shows in a diagram an occupation of a communication channel caused by a downlink transmission comprising a plurality of sub-data packets that are transmitted in a plurality of downlink transmission sub-windows, wherein the plurality of sub-data packets are repositioned uniformly within the corresponding downlink transmission sub-windows, in order to avoid a collision with another transmission, according to an embodiment.

In detail, FIG. 6 shows in a diagram an occupation of a communication channel (e.g., a (portion) of the radio band) induced by a downlink transmission 122 comprising a plurality of sub-data packets 142_1 to 142_i that are transmitted in a plurality of downlink transmission (sub-) windows 124_1 to 124_i, wherein the plurality of sub-data packets 142_1 to 142_i are repositioned uniformly within the corresponding downlink transmission (sub-)windows 124_1 to 124_i, in order to avoid a collision with another transmission 150. Thereby, the ordinate denotes the frequency and the abscissa the time.

As shown in FIG. 6 by way of example, optionally, also the plurality of sub-data packets 152_1 to 152_m of the other transmission 150 (e.g., also a downlink transmission as already mentioned with respect to FIG. 5) can be repositioned uniformly within the corresponding downlink transmission (sub-)windows 154_1 to 154_m, in order to avoid the collision with the downlink transmission 122.

In other words, FIG. 6 shows in a diagram that intrapattern consistency (=consistency of the time/frequency hopping pattern according to which the plurality of sub-data packets 142_1 to 142_i are transmitted) can be maintained by applying the frequency shift to all sub-data packets 142_1 to 142_i of the (downlink) transmission 122.

This is important, as the receiver (e.g., end point 106_1) might not compensate tolerances for single sub-data packets but only synchronize on consistent patterns of sub-data packets 142_1 to 142_i. In this case, the downlink window tolerances for each sub-data packet 142_1 to 142_i has to be taken into consideration when resolving the conflict as the tolerances might be different for each sub-data packet 142_1 to 142_i. For example, the exploitable timing deviation might decrease with the length of the transmission as the uncertainty in oscillator offsets might increase.

In embodiments, consistency is maintained between sub-data packets 142_1 to 142_i of a (downlink) transmission 122 by shifting all sub-data packets 142_1 to 142_i accordingly when one sub-data packet (e.g., sub-data packet 142_3 in FIG. 6) needs to be shifted to avoid a collision with another transmission 150.

Figure 7:
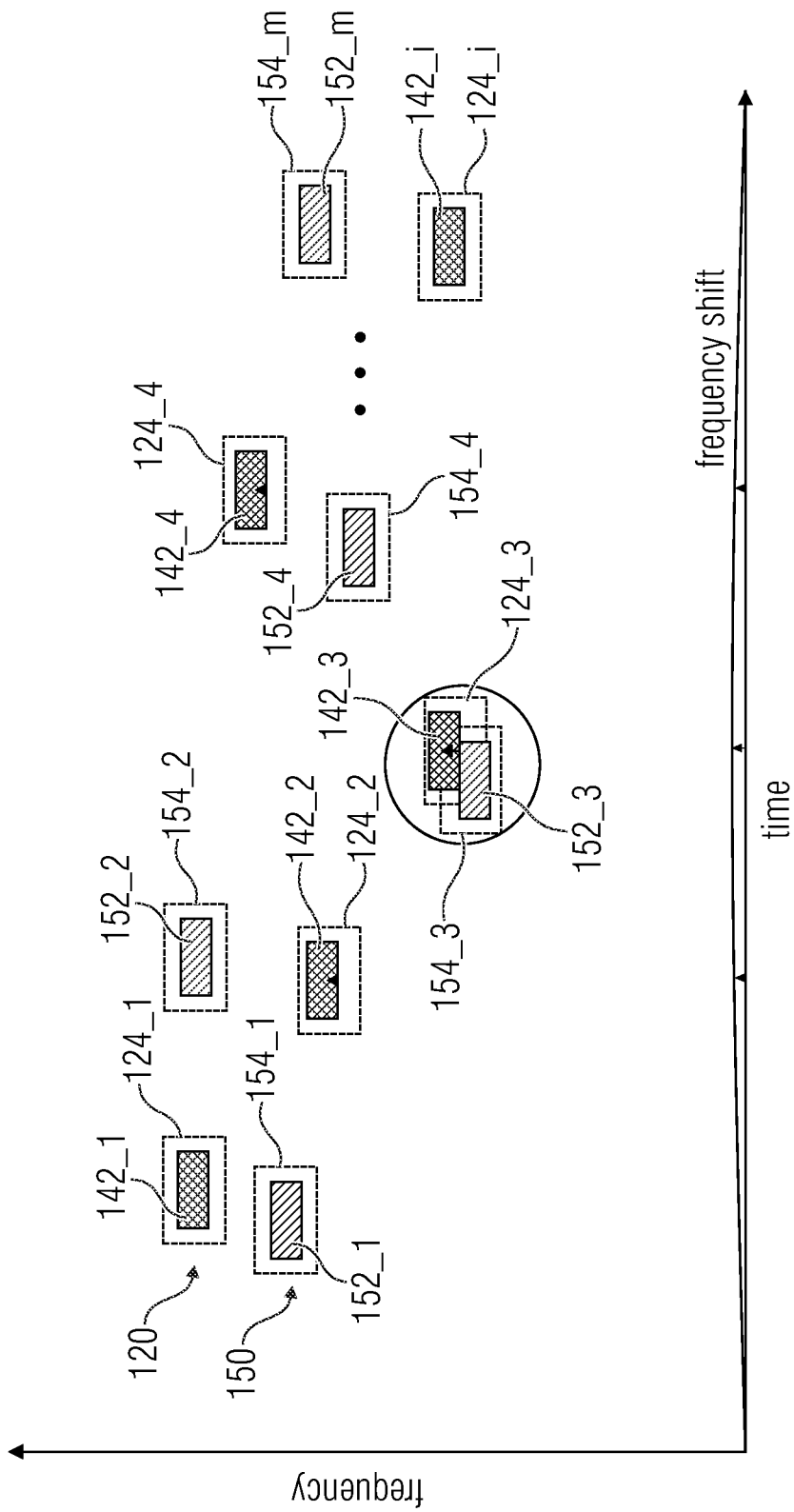
FIG. 7 shows in a diagram an occupation of a communication channel caused by a downlink transmission comprising a plurality of sub-data packets that are transmitted in a plurality of downlink transmission sub-windows, wherein the plurality of sub-data packets are repositioned according to an emulated doppler shift on the downlink transmission between the base station and the end-point, in order to avoid a collision with another transmission, according to an embodiment.

Considering tolerances to acceleration (change in Doppler shift), consistency of the sub-data packet pattern does not necessarily require all sub-data packets 142_1 to 142_i to be shifted equally. For example, the base station 104_1 might drag a certain section (at the beginning, ending or in the middle) of the telegram (represented by some consecutive sub-data packets), which conflicts with another transmission 150, to a lower or higher frequency by applying and increasing frequency offset at the beginning and/or a decreasing frequency offset at the ending of the section. The rest of the telegram (sub-data packets before and/or after the shifted section) can remain unaltered. This emulates the acceleration and/or deceleration of the end point 106_1 in respect to the base station 104_1 during the modified section. Accordingly, the base station 104_1 might be able to resolve a collision of one sub-data packet (e.g., sub-data packet 142_3) by shifting only the colliding sub-data packet and one or some adjacent sub-data packets before and/or after it, while still maintaining a consistent pattern constellation within the end point's expectations. FIG. 7 demonstrates this concept graphically. Of course, the technique might also be applied to all conflicting transmissions simultaneously to further increase the range of resolvable collisions.

In detail, FIG. 7 shows in a diagram an occupation of a communication channel (or (portion) of the radio band) induced by a downlink transmission 122 comprising a plurality of sub-data packets 142_1 to 142_i that are transmitted in a plurality of downlink transmission (sub-) windows 124_1 to 124_i, wherein the plurality of sub-data packets 142_1 to 142_i are repositioned according to an emulated doppler shift on the downlink transmission 122 between the base station 104_1 and the end-point 106_1. Thereby, the ordinate denotes the frequency and the abscissa the time. In other words, FIG. 7 shows in a diagram that intrapattern consistency can be maintained via an emulated change in Doppler induced frequency shift.

As shown in FIG. 7 by way of example, the other transmission 150 also may comprise a plurality of sub-data packets 152_1 to 152_m that are transmitted in a plurality of downlink transmission windows 154_1 to 154_m (compare with FIGS. 5 and 6).

In embodiments, sub-data packet consistency can be maintained via emulated change in Doppler shift during the transmission 122, e.g., instead of shifting all sub-data packets 142_1 to 142_i equally in the frequency domain.

If multiple (downlink) transmissions can be transmitted on different frequencies at the same time (e.g., by one base station 104_1), the transmitted power is usually distributed to the (downlink) transmissions, reducing the power for every single (downlink) transmission. In this case, the power of a (downlink) transmission is dependent on concurrent (downlink) transmissions. To still provide a consistent transmission power level for the receiver (e.g., end point 106_1), the (downlink) transmission might be adapted accordingly. For example, sections of a (downlink) transmission which are transmitted with less concurrent (downlink) transmissions might be attenuated in order to achieve the same power level as sections transmitted with more concurrent (downlink) transmissions.

In embodiments, power throughout parts of a (downlink) transmission can be equalized, when the number of concurrent (downlink) transmissions is varying.

The transmitter (e.g., base station 104_1) might also be able to indicate the shift in time and/or frequency of following sub-data packets or parts of a (downlink) transmission in a preceding part of the (downlink) transmission. In this case, the transmitter (e.g., base station 104_1) can resolve conflicts by moving later parts of a (downlink) transmission outside of the downlink window tolerances and modifying the earlier part of the (downlink) transmission to include the information about the relocation and/or the new position and/or offset to the old position. The relocation might also be used to align multiple downlink transmissions to be simultaneously on different frequencies in order to optimize for duty cycle constraints or to reduce the interruption in uplink reception time (i.e. when the same frequency band is used for uplink and downlink).

In embodiments, later parts of a (downlink) transmission ca be relocated and the relocation can be indicated in the earlier part of the (downlink) transmission.

In embodiments, later parts of a (downlink) transmission ca be relocated to align multiple (downlink) transmissions for simultaneous (downlink) transmission on different frequencies.

2. Transmission Quality Metric

In the case of inevitable collisions between sub-data packets or parts of sub-data packets, one or multiple sub-data packets or partial sub-data packets might have to be omitted from the (downlink) transmission 122. To optimize which sub-data packets are omitted, a metric might be used to keep track of the assumed overall quality of every (downlink) transmission. This also applies to modifications done in order to avoid collisions as described in the previous section. The quality metric might factor in known channel characteristics, receiver properties and previous modifications and/or omissions due to collision resolution. Based on system capabilities it is assumed, that a (downlink) transmission will be successful with a certain probability as long as the quality metric for the (downlink) transmission stays above the according threshold.

When a downlink transmission 122 is assembled, it is given an initial quality value or quality budget. This value might be based on properties of the message, information retrieved during the reception of preceding uplink messages, information included in preceding uplink messages or acquired via a side-channel. For example, the estimated channel quality, distance to the end point, reception capabilities of the end point, size of the message (number and length of sub-data packets), channel coding of the message (robustness against loss of parts of the (downlink) transmission), priority or importance of the message (user assigned or based on included control info), success rate of previous messages to the end point, expected time to next downlink window (how often can the end point be reached) etc.

In embodiments, a quality value can be assigned to every (downlink) transmission 122 based on system and/or transmitter and/or receiver and/or channel and/or transmission properties, which represents the assumed reception quality of the (downlink) transmission.

When a collision between sub-data packets (e.g., sub-data packets 142_3 and 152_3 in FIGS. 5, 6 and 7) occurs, the quality budget of the according (downlink) transmissions can be used to decide which sub-data packet to omit (fully or partially). The (downlink) transmission with the most quality budget remaining (before reaching the threshold) can be assumed to be most likely to still succeed after removal of the conflicting sub-data packet. The removal of a sub-data packet (or parts of a sub-data packet) will be reflected by subtracting an according amount from the quality budget of the (downlink) transmission. Thus, the quality budget indicates the perceived condition of the (downlink) transmission factoring in all modifications done in order to avoid collisions. The priority might either also be factored in the quality budget or threshold by reducing the initial quality budget or increasing the threshold with increasing priority, or it might be kept as a separate metric.

Keeping a separate priority value allows to strictly represent the assumed transmission quality and the assumed limit for a successful reception with the quality budget and the quality threshold respectively. The priority value in this case might be used as a multiplier on the loss in perceived quality to compute a cost value for any modification to a (downlink) transmission. In the case of a conflict the resolution with the least overall costs can be selected.

An example with two conflicting downlink transmission A and B and two options for conflict resolution can be seen here:

Priority transmission A: 6
Priority transmission B: 1
Option 1: Omit one sub-data packet from (downlink) transmission A, reducing the quality metric of (downlink) transmission A by 0.5.
Option 2: Shift transmissions A and B within the downlink window tolerances, reducing the quality metric of both (downlink) transmissions A and B by 0.1 each.
Cost for option 1:

$$\underbrace{0.5}_{Quality\ reduction} \cdot \underbrace{1}_{Priority} = 0.5$$

Cost for option 2:

$$\underbrace{0.1 \cdot 1}_{Shift\ of\ trans.\ A} + \underbrace{0.1 \cdot 6}_{Shift\ of\ trans.\ B} = 0.7$$

In this case, the removal of the sub-data packet from (downlink) transmission A would be chosen as the less expensive option.

In embodiments, a cost value can be computed for different options in the process of collision resolution based on the perceived loss in transmission quality and the transmission priority. Thereby, the least expensive option is chosen.

If the power of a (downlink) transmission (or parts of a (downlink) transmission) is reduced dependent on the number of concurrent (downlink) transmissions on different frequencies, this reduction might also be represented in the quality metric. Basically, parallel (downlink) transmission might also be considered collisions even for transmitters (e.g., base stations 104_1 and 104_2) which are able to transmit on multiple frequency channels simultaneously. This principle might also apply to distortions due to transmissions in neighboring channels or other transmitter induced cross-influences. In general, if the presence of a concurrent transmission is affecting other transmissions, the concurrency might also be considered a collision. Accordingly, the quality metric can then also represent influences of concurrent (downlink) transmissions. The resolution of the collision might be different depending on the cause of the collision or there might be no requirement for an actual resolution (but only the consideration in the quality metric).

In embodiments, concurrent (downlink) transmissions on different frequencies which influence each other can be handled as collisions even when the transmitter (e.g., base station 104_1) can transmit them concurrently.

When a transmission's quality is reduced below the threshold due to conflict resolution and the (downlink) transmission 122 is thus not assumed to be successfully receivable by the recipient (e.g., end point 106_1), it might be removed from the pool of queued (downlink) transmissions to also free up all remaining resources occupied by the (downlink) transmission. (Downlink) transmissions which have been partially sent already might receive a bonus in the cost calculation based on the amount of data sent. This avoids invalidation of (downlink) transmissions where resources (i.e. duty cycle) have already been spent and cannot be recovered.

In the case of more than two conflicting (downlink) transmissions this might allow to resolve conflicts without invalidation of multiple (downlink) transmissions. After removing the least expensive (downlink) transmission the regained resources can be used to resolve the remaining (downlink) transmission conflicts without further invalidations.

In embodiments, when a (downlink) transmission is invalidated, remaining sub-data packets of the (downlink) transmission can be removed to free up resources.

In embodiments, already transmitted sub-data packets/parts of the (downlink) transmission (already invested duty cycle etc.) can be factored in when computing the costs for collision resolution.

The (communication) system 102 might also track all modifications made to other (downlink) transmissions due to conflicts with the removed (downlink) transmission and revert these modifications for parts not transmitted yet. For example, if a sub-data packet of (downlink) transmission A was marked for omission due to a conflict with a sub-data packet of a (downlink) transmission B, which is later removed (to resolve other conflicts), the sub-data packet in (downlink) transmission A does not have to be omitted anymore. The system might then also iteratively recompute all conflict resolutions for cost effectiveness whenever a (downlink) transmission is removed or added to the queued transmissions.

In embodiments, modifications to (downlink) transmissions which were caused by collision resolution can be reverted, when the corresponding (downlink) transmission is invalidated (i.e. by further collision resolution operations).

If the (communication) system 102 has information about the channel at the time of transmission of a sub-data packet (listen before transmit, full duplex in same band, estimation based on previous observations or uplink transmissions etc.) the channel quality at transmission time might also be factored into the quality metric. Specifically, a sub-data packet sent during interferences can be reflected with a reduction of the quality budget. Likewise, this information might also be factored in when calculating the costs for a modification of a (downlink) transmission 122. For example, omitting a sub-data packet which is expected to experience bad channel characteristics might be associated with lower costs. The system also might decide to not send the sub-data packet at all if the channel conditions are inadequate. This might then be reflected in the quality metric in the same way as a sub-data packet omitted due to conflicts with another transmission 150.

In embodiments, available channel quality information can be used to improve the computed quality values and cost values.

If a (communication) system 102 can provide at least partial information about the success of (downlink) transmissions and/or the perceived quality of a (downlink) transmission at the receiver (e.g., end point 106_1), for example, via acknowledgement mechanisms, side channel information or observation of the system behavior, the quality metric might be adapted and optimized during the system operation. For example, machine learning techniques might be applied to extract correlations between certain conditions and/or modifications to the (downlink) transmission with the reception quality. Accordingly, the parameters of the quality metric can then be adapted to most accurately reflect the gathered correlations and thus maximize the downlink success rate.

In embodiments, the quality metric can be adapted dynamically based on feedback about the actual reception conditions.

3. Downlink Scheduling and Queuing

To allow optimal utilization of downlink windows 124 (or downlink transmission windows, e.g., downlink transmission (sub-)windows), a (communication) system 102 might support queuing prepared downlink data for one or multiple future (downlink) transmissions at a location with lower response delays and/or increased service availability in respect to the transmitter/receiver unit (e.g., base station 104_1 and end point 106_1).

For example, the information might be kept in a base station 104_1 so it is available for a downlink transmission almost immediately in case of reception of an (uplink transmission with an) uplink message, opening a downlink window. This allows sending (a downlink transmission with) downlink data in situations where the actual origin of the downlink data cannot provide the data on time within the uplink/downlink offset due to network delays, processing delays, temporary unavailability of connections of components in the network, etc.

In embodiments, downlink data can be queued closer to the transmitter in order to satisfy uplink/downlink timing requirements when delays from the data source might be too high.

The (communication) system 102 might also allow updating the queued downlink data until it is due to be transmitted within a downlink window 124. For example, the data source of the downlink data might queue some data for an end point 106_1 within the system as a fallback. When an actual downlink window 124 opens up the source then might try to update the queued data based on updated information from the uplink transmission 120 or other changed conditions. If the updated information does not proceed to the transmitter (e.g., base station 104_1) on time, the previously queued data is used for the downlink transmission 122. The queued fallback data might contain information which should be sent to the end point 106_1 independent of changed conditions or it might contain information based on the latest conditions available at that time.

In embodiments, updating the downlink data based on the preceding uplink data is allowed, wherein previously queued downlink data is used as fallback if timing constraints cannot be met for updated data.

Queuing might also be used to reduce or avoid conflicts in downlink transmissions. If data for multiple (downlink) transmissions to an end point 106_1 is queued and does not need to be delivered in order, the data for the (downlink) transmission 122 might be chosen in order to create the least conflicts with other transmissions 150 or system constraints. For example, if queued data A results in a longer transmission, queued data B might be selected for the (downlink) transmission 122 instead to avoid exceeding duty cycle limits or to avoid conflicts with other transmissions 150 caused by the additional needed sub-data packets in case of a longer (downlink) transmission.

In embodiments, downlink data can be selected from multiple queued data based on projected collisions with other transmissions 150.

When a downlink window 124 cannot be used for a full downlink transmission 122 despite data being available due to duty cycle constraints, conflicts with other transmissions 150 or channel conditions, a shorter (downlink) transmission 122 might be sent to request another uplink/downlink cycle at a later time. This avoids missing the opportunity to contact the end point 106_1 for a potentially long time. For example, if an end point 106_1 usually transmits one uplink message (or uplink transmission 120) per day and the (communication) system 102 is not able to respond at the time of this uplink transmission 120 with a full downlink transmission 122, the short response could indicate to the end point 106_1 to transmit another uplink transmission 120, for example, in one hour. The additional uplink transmission 120 might only be used to open another downlink window 124 if no new uplink data is available.

In embodiments, a short request can be send for a further downlink window 124 if a (downlink) transmission 122 of downlink data is not possible currently due to collisions, duty cycle constraints and/or channel conditions.

If multiple base stations 104_1 and 104_2 are available in a (communication) system 102 with at least partially overlapping coverage, the (communication) system 102 can assign downlink transmissions 122 to different base stations 104_1 and 104_2 within the reception range of the end point 106_1. This might extend to scheduling different sub-data packets of one downlink transmission 122 at different base stations 104_1 and 104_2 as illustrated in FIG. 8.

Figure 8:
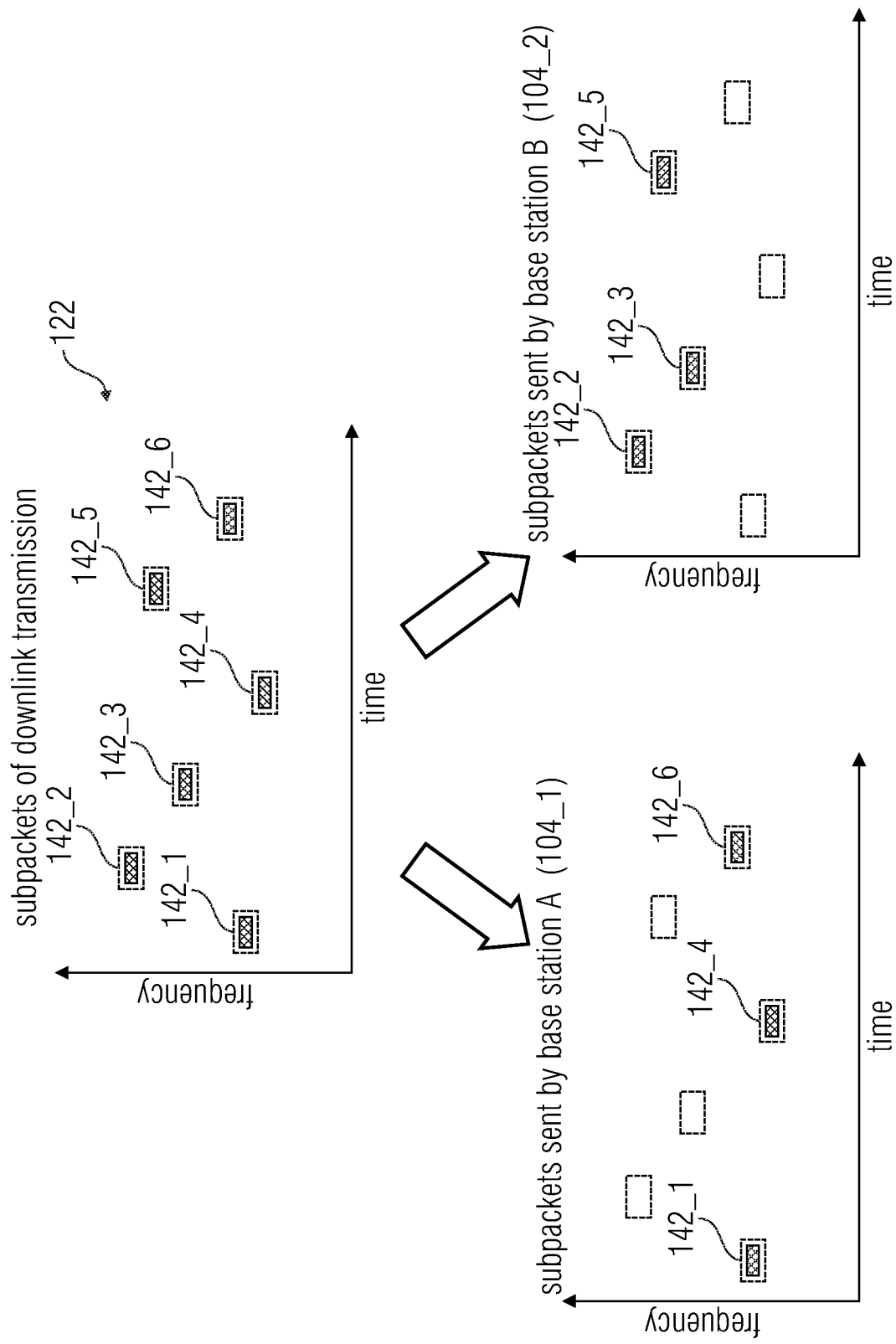
FIG. 8 shows a schematic view of a downlink transmission comprising a plurality of sub-data packets and a distribution of the plurality of sub-data packets of the downlink transmission to two base stations, each of which transmits a subset of the plurality of sub-data packets of the downlink transmission, according to an embodiment.

In detail, FIG. 8 shows a schematic view of a downlink transmission 122 comprising a plurality of sub-data packets 142_1 to 142_6 and a distribution of the plurality of sub-data packets 142_1 to 142_6 to two base stations 104_1 and 104_2, each of which transmits a subset of the plurality of sub-data packets 142_1 to 142_6 of the downlink transmission 122. In detail, sub-data packets 142_1, 142_4 and 142_6 can be transmitted by the first base station 104_1, wherein sub-data packets 142_2, 142_3 and 142_5 can be transmitted by the second base station 104_2. In other words, FIG. 8 shows a distribution of sub-data packets 142_1 to 142_6 of a (downlink) transmission 122 to multiple base stations 104_1 and 104_2.

The assignment of (downlink) transmissions 120 or sub-data packets 142_1 to 142_6 to base stations 104_1 and 104_2 might consider available duty cycle, channel properties between the base station and the end point and/or conflicts with other transmissions at the base station. For example, for two base stations A and B with partially overlapping coverage and an end point C within coverage of both base stations, different frequency selective channels might be observed from base station A to end point C and base station B to end point C. Thus, for different sub-data packets at different frequencies either the channel properties between base station A and end point C or base station B and end point C can be advantageous.

In embodiments, (downlink) transmissions or sub-data packets of (downlink) transmissions for an end point 106_1 can be distributed to different base stations 104_1 and 104_2 with coverage for the end point 106_1 based on duty cycle and/or colliding transmissions and/or channel properties.

Large deviations in received signal level at the end point 106_1 between sub-data packets 142_1 to 142_6 sent by different base stations 104_1 and 104_2 might occur due to different path losses, channel properties, multipath-fading etc. The (communication) system 102 can estimate the received signal strength at the end point 106_1, for example, based on previous transmissions, channel observations and/or information acquired via a side channel. These estimations might be used to compensate the received signal level deviations at least partially by adjusting the transmitted signal power at the base stations 104_1 and 104_2 to achieve a more consistent received signal level. The same principle can be applied to differences in the path delay which might be compensated by adaptations to the (downlink) transmission times at the different base stations 104_1 and 104_2.

In embodiments, estimated signal attenuations and/or delays can be used when sending a (downlink) transmission 120 from multiple base stations 104_1 to 104_2 to compensate differences by adapting transmission power and/or time.

In the case of conflicting transmissions (e.g., downlink transmission 120 and other transmission 150) the (communication) system 102 can optimize every sub-data packet assignment for the resulting contribution to the transmission quality against the interference (or loss of quality) caused for other transmissions 150. Referring to the transmission quality metric discussed in the previous section, the (communication) system 102 might evaluate the reduction in quality caused by the sub-data packet transmission (due to conflict resolution) and the increase in quality budget provided by the sub-data packet transmission for every base station 104_1 and 104_2.

For example, provided two base stations A and B and two end points C and D, base station A might be received by end point C with higher signal level than by end point D, while base station B is received by end point D with higher signal level than by end point C. By assigning conflicting sub-data packets for endpoints C and D to base stations A and B respectively, each sub-data packet will be received by the according end point with higher signal level than the conflicting sub-data packet for the other end point. The quality metric might reflect this by reducing the contributed quality for the sub-data packets according to the strength of the interference caused by the conflicting sub-data packet sent by the other base station.

In embodiments, a quality metric can be used to optimize sub-data packet assignment to different base stations 104_1 and 104_2 based on computed contribution to transmission quality and inflicted costs due to caused conflicts.

When a base station (e.g., 104_1) cannot send multiple sub-data packets at different frequencies simultaneously, causing a conflict at the transmitter (of the base station) but not in the channel, the conflict can be mitigated entirely by assigning simultaneous sub-data packets to different base stations 104_1 and 104_2.

After finishing a transmission, a result might be reported back to the initiator of the transmission. This might include the assumed transmission quality (down to none in case of removal/invalidation of the transmission) as provided via the transmission quality metric. The result information with quality metric can be used as a weak acknowledgement or lack thereof when a real acknowledgement of the reception might not be available.

In embodiments, a quality metric can be used as weak acknowledgement for the transmission, allowing to gauge the success probability in absence of a real acknowledgement.

4. Signal Combining

If two at least partially overlapping sub-data packets (e.g., sub-data packets 142_3 and 152_3 in FIGS. 5, 6 and 7 of downlink transmission 122_1 and downlink transmission 122_2 (see FIG. 4) as other transmission 150) are scheduled to be sent by one base station 104_1, the base station 104_1 might only send the signal portions of the overlapping section (of the downlink transmissions 122_1 and 122_2) which correlate positively to each other. The combined signal can then still contribute to the received information at both end points (e.g., end points 106_1 and 106_2) and thus increase the probability for the end points 106_1 and 106_2 to detect the corresponding (downlink) transmission 122_1 and 122_2 and/or to recover the correct information from the channel coding of the corresponding (downlink) transmission 122_1 and 122_2.

In embodiments, only positively correlated signal components for overlapping sections of (downlink) transmissions 122_1 and 122_2 can be transmitted.

If multiple base stations 104_1 and 104_2 are available in a (communication) system 102 with at least partially overlapping coverage and known locations and/or path delays and/or path losses, a combined signal can be formed by coordinating the base stations 104_1 and 104_2. Each base station 104_1 and 104_2 can then be considered an antenna in the sense of a MIMO antenna array. This allows spatially separating the end points 106_1 and 106_2 via transmission of phase shifted and/or attenuated copies of the same (downlink) transmission from multiple base stations 104_1 and 104_2 in order to generate areas of positive and negative interference (beam-forming). If some or all or the base stations 104_1 and 104_2 have multiple antennas in one device (MIMO base station), these MIMO capabilities might also be used when coordinating multiple base stations 104_1 and 104_2. A precise common time reference may be needed for all base stations 104_1 and 104_2 in this case. This might, for example, be obtained from a satellite navigation system like GPS, Galileo or GLONASS.

In embodiments, individual base stations 104_1 and 104_2 can be coordinated to allow usage as a MIMO antenna array.

In the case of mobile end points and/or base stations or unknown locations in general, the uplink transmission might be used to estimate (at least relative) positions by combining the reception information (time, power, phase, etc.) from multiple base stations 104_1 and 104_2 (triangulation). These positions can then be used to direct beamforming for the consecutive downlink transmission or to improve downlink scheduling in general (i.e. via quality metric).

In embodiments, position information for downlink scheduling and/or beamforming can be scheduled from preceding uplink transmission.

MIMO beamforming might also be used to boost the power of a (downlink) transmission for end points with difficult reception conditions (i.e. determined by quality metric, estimated channel conditions or location of the endpoint). Instead of transmitting multiple, potentially conflicting, transmissions simultaneously, the beam forming is then used to direct a larger amount of the transmitted power towards the targeted end point. This also allows avoiding or reducing the transmission of false data to other end points not targeted. False data might i.e. reduce an end points ability to receive another (downlink) transmission actually concerning the end point or result in wasted energy.

In embodiments, beamforming can be used to boost transmissions for end points with difficult reception conditions.

In embodiments, beamforming can be used to reduce or avoid transmission of false data to end points not targeted.

5. Further Embodiments

Figure 9:
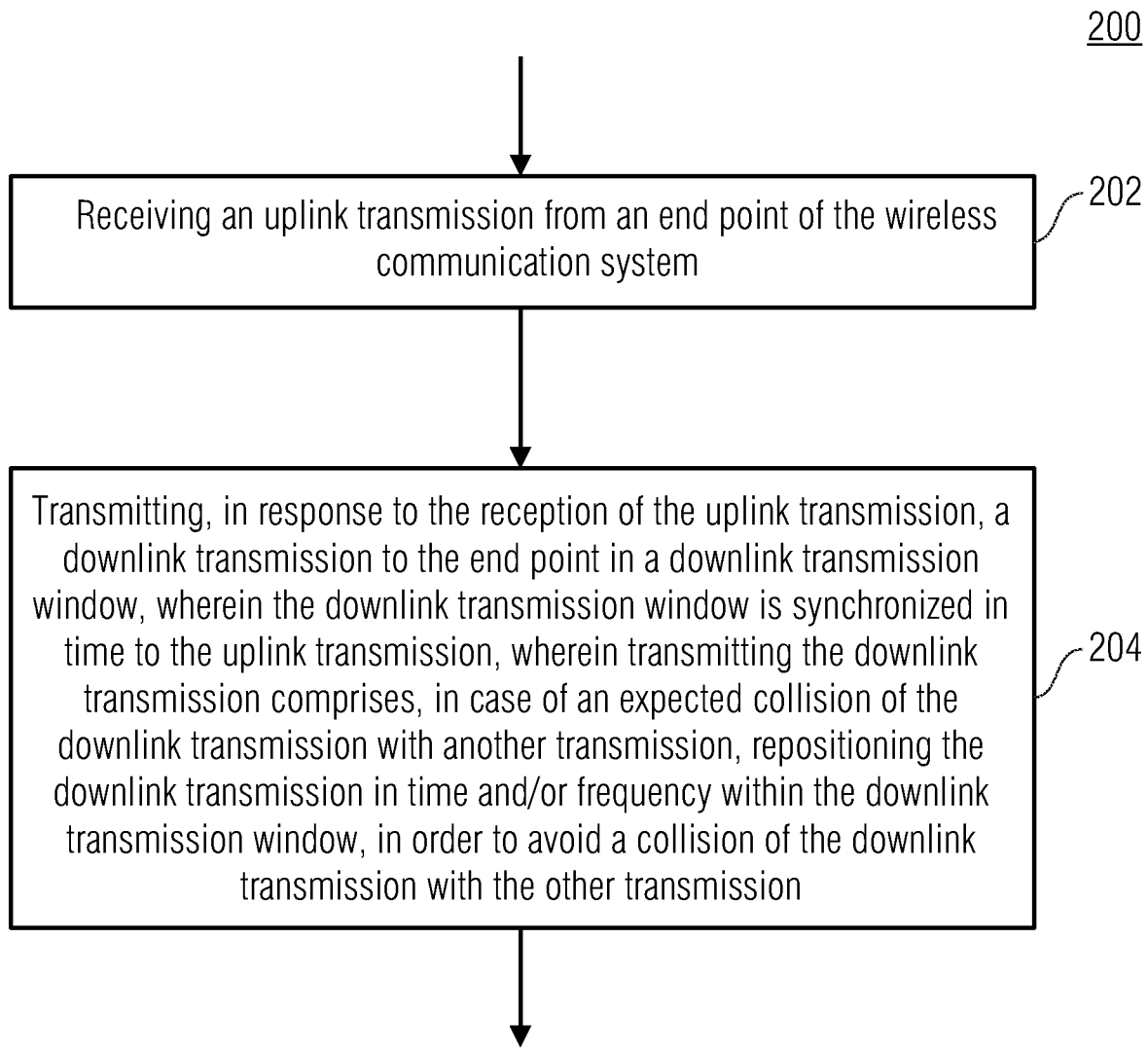
FIG. 9 shows a flow chart of a method for transmitting a downlink transmission in an uncoordinated wireless communication system, according to an embodiment.

FIG. 9 shows a flow chart of a method 200 for transmitting a downlink transmission in an uncoordinated wireless communication system communicating in a radio band [e.g. ISM radio band] used by a plurality of communication systems, according to an embodiment. The method 200 comprises a step 202 of receiving an uplink transmission from an end point of the wireless communication system. Further, the method 200 comprises a step 204 of transmitting, in response to the reception of the uplink transmission, a downlink transmission to the end point in a downlink transmission window, wherein the downlink transmission window is synchronized in time to the uplink transmission [e.g., with a specific offset between the uplink transmission of the point and the downlink transmission window], wherein transmitting the downlink transmission comprises, in case of an expected [e.g., probable] collision of the downlink transmission with another transmission [e.g., of the base station or another entity of the wireless communication system; or of another communication system], to repositioning [e.g. shifting] the downlink transmission in time and/or frequency [e.g., by applying a time and/or frequency offset to the downlink transmission] within the downlink transmission window, in order to avoid a collision of the downlink transmission with the other transmission.

Figure 10:
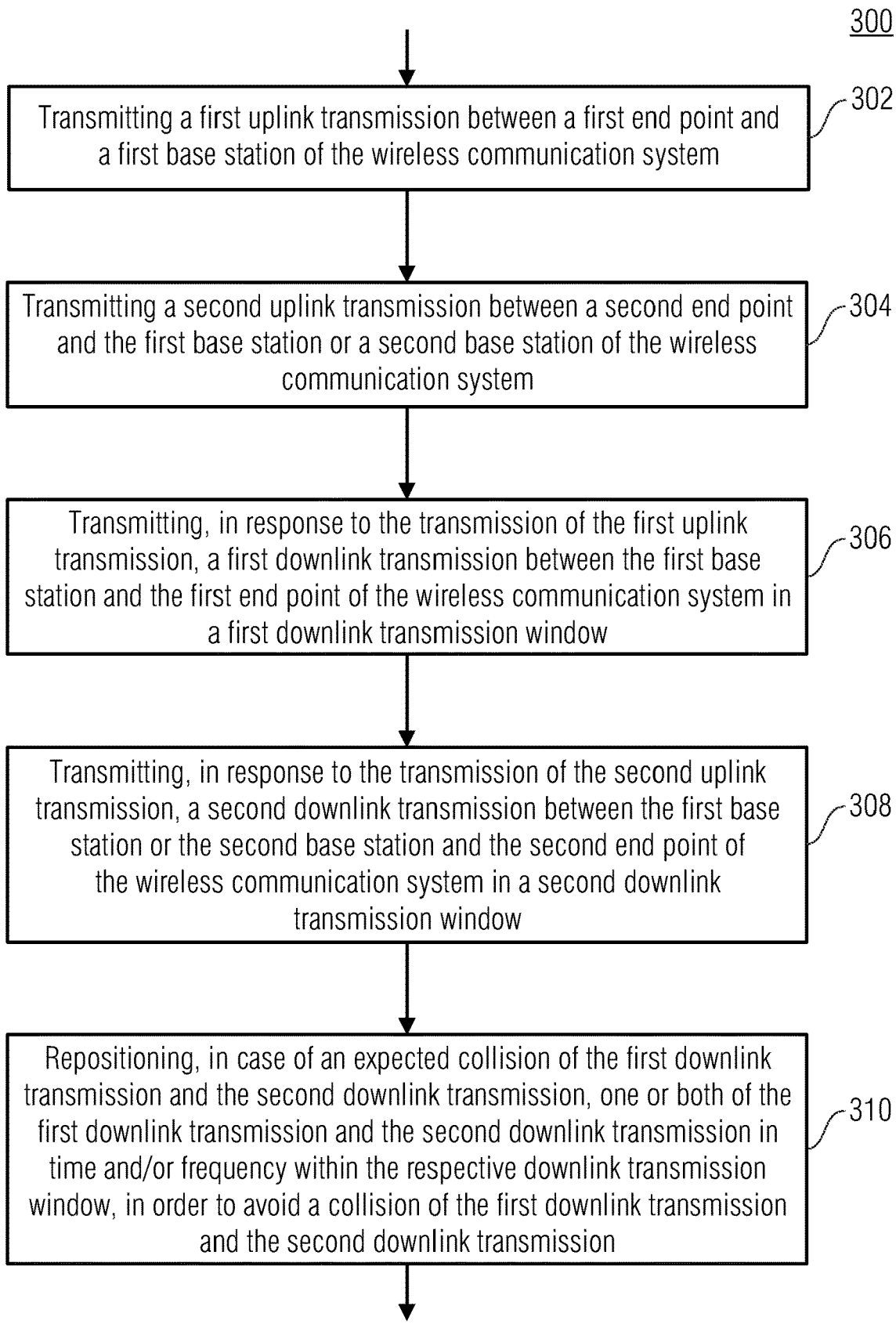
FIG. 10 shows a flow chart of a method for transmitting data in an uncoordinated wireless communication system, according to an embodiment.

FIG. 10 shows a flow chart of a method 300 for transmitting data in an uncoordinated wireless communication system communicating in a radio band [e.g. ISM radio band] used by a plurality of communication systems. The method 300 comprises a step 302 of transmitting a first uplink transmission between a first end point and a first base station of the wireless communication system. Further, the method 300 comprises a step 304 of transmitting a second uplink transmission between a second end point and the first base station or a second base station of the wireless communication system. Further, the method 300 comprises a step 306 of transmitting, in response to the transmission of the first uplink transmission, a first downlink transmission between the first base station and the first end point of the wireless communication system in a first downlink transmission window, [e.g., wherein the first downlink transmission window is synchronized in time and/or frequency [e.g., with a specific offset in between] to the first uplink transmission]. Further, the method 300 comprises a step 308 of transmitting, in response to the transmission of the second uplink transmission, a second downlink transmission between the first base station or the second base station and the second end point of the wireless communication system in a second downlink transmission window, [e.g., wherein the second downlink transmission window is synchronized in time and/or frequency [e.g., with a specific offset in between] to the second uplink transmission]. Further, the method 300 comprises a step 310 of repositioning [e.g., shifting], in case of an expected [e.g., probable] collision of the first downlink transmission and the second downlink transmission, one or both of the first downlink transmission and the second downlink transmission in time and/or frequency [e.g., by applying a time and/or frequency offset to the respective downlink transmission] within the respective downlink transmission window [e.g., prior or during transmission of the respective downlink transmission], in order to avoid a collision of the first downlink transmission and the second downlink transmission.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] DE 10 2011 082 098 B1
[2] DE 10 2016 205 052 A1
[3] DE 10 2016 205 054 A1
[4] ETSI 103 357 TS-UNB

The invention claimed is:

1. Base station of an uncoordinated wireless communication system,
wherein the communication system is configured to communicate in a radio band used by a plurality of communication systems,
wherein the base station is configured to receive an uplink transmission from an end point of the wireless communication system,
wherein the base station is configured to transmit, in response to the reception of the uplink transmission, a downlink transmission to the end point in a downlink transmission window, wherein the downlink transmission window is synchronized in time to the uplink transmission,
wherein the base station is configured, in case of an expected collision of the downlink transmission with another transmission, to reposition the downlink transmission in time and/or frequency within the downlink transmission window, in order to avoid a collision of the downlink transmission with the other transmission.

2. Base station according to claim 1,
wherein the downlink transmission window is synchronized in frequency to the uplink transmission.

3. Base station according to claim 1,
wherein the base station is configured to estimate a collision probability of the downlink transmission with another transmission, in order to determine whether a collision of the downlink transmission with another transmission is expected.

4. Base station according to claim 1,
wherein the base station is configured to acquire an information describing other planned transmissions of the communication system,
wherein the base station is configured to determine whether a collision of the downlink transmission with another transmission is expected based on the information describing planned transmissions of the communication system.

5. Base station according to claim 1,
wherein a length and/or bandwidth of the downlink transmission window considers transmission tolerances of the communication system,
wherein the transmission tolerances are frequency deviations, time deviations, multipath propagation, and/or doppler shift.

6. Base station according to claim 5,
wherein the base station is configured to reposition the downlink transmission in time and/or frequency within the downlink transmission window, thereby exploiting remaining transmission tolerances of the communication system.

7. Base station according to claim 1,
wherein the downlink transmission window comprises a plurality of downlink transmission sub-windows,
wherein the downlink transmission is a telegram splitting based downlink transmission that is transmitted non-concurrently in the plurality of downlink transmission sub-windows.

8. Base station according to claim 1,
wherein the downlink transmission comprises a plurality of sub-data packets that are transmitted non-concurrently in a plurality of downlink transmission sub-windows,
wherein the base station is configured to reposition at least a subset of the plurality of sub-data packets of the downlink transmission in time and/or frequency within the plurality of downlink transmission sub-windows, in order to avoid a collision of the downlink transmission with the other transmission.

9. Base station according to claim 8,
wherein the base station is configured to reposition the subset of the plurality of sub-data packets uniformly in time and/or frequency within the downlink transmission sub-windows.

10. Base station according to claim 8,
wherein the base station is configured to reposition the subset of the plurality of sub-data packets within the downlink transmission sub-windows according to an emulated doppler shift on the downlink transmission between the base station and the end point.

11. Base station according to claim 8,
wherein the base station is configured to reposition the plurality of sub-data packets within the downlink transmission sub-windows by applying time and/or frequency offsets to the plurality of sub-data packets or at least a subset of the plurality of sub-data packets.

12. Base station according to claim 8,
wherein the base station is configured to equalize the power of the transmissions of the plurality of sub-data packets.

13. Base station according to claim 12,
wherein the base station is configured to compensate a deviation in transmission power for different sub-data packets of the downlink transmission, caused by a different number of concurrent transmissions, by attenuating sub-data packet transmissions or parts of sub-data packet transmissions with a lower number of concurrent transmissions accordingly.

14. Base station according to claim 8,
wherein the base station is configured to re-allocate a second subset of the plurality of sub-data packets of the downlink transmission to other downlink transmission sub-windows and to indicate in a first subset of the plurality of sub-data packets the other downlink transmission sub-windows to which the second subset of the plurality of sub-data packets are re-allocated.

15. Base station according to claim 8,
wherein the base station is configured to re-allocate a second subset of the plurality of sub-data packets of the downlink transmission to other downlink transmission sub-windows, to align multiple transmissions for simultaneous transmission on different frequencies.

16. Base station according to claim 8,
wherein the plurality of sub-data packets are coded,
wherein the base station is configured to not transmit a sub-data packet or a part of a sub-data packet of the plurality of sub-data packets, in order to avoid a collision of the downlink transmission with the other transmission.

17. Base station according to claim 1,
wherein the base station is configured to queue downlink data to be transmitted in the downlink transmission.

18. Base station according to claim 17,
wherein the base station is configured to update or allow updating the queued downlink data based on uplink data received with the uplink transmission.

19. Base station according to claim 18,
wherein the base station is configured to transmit the previously queued downlink data in the downlink transmission, if a timing constraint cannot be met for the updated downlink data.

20. Base station according to claim 17,
wherein the base station is configured to select downlink data to be transmitted in the downlink transmission from the queued downlink data in dependence on an expected collision of the respective downlink transmission comprising the respective downlink data and another transmission.

21. Base station according to claim 1,
wherein the base station is configured to request a further downlink transmission window if a transmission of the downlink transmission in the downlink transmission window is not possible due to collisions, duty cycle constraints and/or channel conditions.

22. Base station according to claim 1,
wherein the base station is configured, in case of an expected collision of the downlink transmission with another transmission, to only transmit portions of the downlink transmission that positively correlate with the other transmission.

23. Method for operating a base station of an uncoordinated wireless communication system communicating in a radio band used by a plurality of communication systems, the method comprising:
receiving an uplink transmission from an end point of the wireless communication system,
transmitting, in response to the reception of the uplink transmission, a downlink transmission to the end point in a downlink transmission window, wherein the downlink transmission window is synchronized in time to the uplink transmission,
wherein transmitting the downlink transmission comprises, in case of an expected collision of the downlink transmission with another transmission, repositioning the downlink transmission in time and/or frequency within the downlink transmission window, in order to avoid a collision of the downlink transmission with the other transmission.

24. Method for transmitting data in an uncoordinated wireless communication system communicating in a radio band used by a plurality of communication systems, the method comprising:
- transmitting a first uplink transmission between a first end point and a first base station of the wireless communication system,
- transmitting a second uplink transmission between a second end point and the first base station or a second base station of the wireless communication system,
- transmitting, in response to the transmission of the first uplink transmission, a first downlink transmission between the first base station and the first end point of the wireless communication system in a first downlink transmission window,
- transmitting, in response to the transmission of the second uplink transmission, a second downlink transmission between the first base station or the second base station and the second end point of the wireless communication system in a second downlink transmission window, and
- repositioning, in case of an expected collision of the first downlink transmission and the second downlink transmission, one or both of the first downlink transmission and the second downlink transmission in time and/or frequency within the respective downlink transmission window, in order to avoid a collision of the first downlink transmission and the second downlink transmission.

25. Method according to claim 24,
wherein the method comprises determining whether a collision of the first downlink transmission and the second downlink transmission is expected based on an estimated collision probability describing a collision probability between the first downlink transmission and the second downlink transmission.

26. Method according to claim 24,
wherein the method comprises determining whether a collision of the first downlink transmission and the second downlink transmission is expected based on an information describing a schedule of first downlink transmission and a schedule of the second downlink transmission.

27. Method according to claim 24,
wherein the first downlink transmission window and the second downlink transmission window consider transmission tolerances of the communication system.

28. Method according to claim 27,
wherein the respective downlink transmission is repositioned in time and/or frequency within the respective downlink transmission window, thereby exploiting remaining transmission tolerances of the communication system.

29. Method according to claim 24,
wherein the first downlink transmission is a telegram splitting based downlink transmission that is transmitted non-concurrently in a plurality of first downlink transmission sub-windows,
wherein the second downlink transmission is a telegram splitting based downlink transmission that is transmitted non-concurrently in a plurality of second downlink transmission sub-windows.

30. Method according to claim 24,
wherein the first downlink transmission comprises a plurality of first sub-data packets that are transmitted non-concurrently in a plurality of first downlink transmission sub-windows,
wherein the second downlink transmission comprises a plurality of second sub-data packets that are transmitted non-concurrently in a plurality of second downlink transmission sub-windows.

31. Method according to claim 30,
wherein repositioning one or both of the first downlink transmission and the second downlink transmission comprises repositioning the plurality of sub-data packets of the respective downlink transmission uniformly in time and/or frequency within the respective downlink transmission sub-windows.

32. Method according to claim 30,
wherein repositioning one or both of the first downlink transmission and the second downlink transmission comprises repositioning the plurality of sub-data packets of the respective downlink transmission according to an emulated a doppler shift on the respective downlink transmission.

33. Method according to claim 30,
wherein repositioning one or both of the first downlink transmission and the second downlink transmission comprises applying time and/or frequency offsets to the plurality of sub-data packets of the respective downlink transmission.

34. Method according to claim 33,
wherein both of the first downlink transmission and the second downlink transmission are repositioned,
wherein opposite time and/or frequency offsets are applied to the sub-data packets of the first downlink transmission and the second downlink transmission.

35. Method according to claim 30,
wherein the first plurality of sub-data packets and the second plurality of sub-data packets are coded,
wherein one or more sub-data packets of the first downlink transmission and/or the second downlink transmission are not transmitted, in order to avoid a collision between the first downlink transmission and the second downlink transmission.

36. Method according to claim 35,
wherein the method comprises determining a quality value for each of first downlink transmission and the second downlink transmission, the quality value describing an assumed reception quality of the respective downlink transmission,
wherein the method comprises determining which sub-data packet of the first plurality of sub-data packets and/or the second plurality of sub-data packets is not transmitted based on the determined quality values in case of an expected collision between a sub-data packet of the first plurality of sub-data packets and a sub-data packet of the second plurality of sub-data packets.

37. Method according to claim 36,
wherein the quality values of the first downlink transmission and the second downlink transmission are determined using channel quality information.

38. Method according to claim 36,
wherein the quality values of the first downlink transmission and the second downlink transmission are adjusted using a defined priority of the data of the respective downlink transmission.

39. Method according to claim 36,
wherein the quality values of the first downlink transmission and the second downlink transmission are adjusted using information about transmitter characteristics of the corresponding downlink transmission and/or receiver characteristics of the corresponding downlink transmission.

40. Method according to claim 36,
wherein the quality values of the first downlink transmission and the second downlink transmission are updated based on feedback data describing the actual reception conditions.

41. Method according to claim 36,
wherein the respective quality value is provided back to the source of the data transmitted with the respective downlink transmission after performing the respective downlink transmission.

42. Method of claim 35,
wherein the method comprises, in case there are two or more options for avoiding a collision between the first downlink transmission and the second downlink transmission, calculating cost values for each of the two or more options for avoiding the collision between the first downlink transmission and the second downlink transmission, the cost value describing a perceived loss of the reception quality, and selecting the least expensive option.

43. Method according to claim 35,
wherein the method comprises determining a quality value for each of first downlink transmission and the second downlink transmission, the quality value describing an assumed reception quality of the respective downlink transmission,
wherein the method comprises updating the quality value for each of the first downlink transmission and the second downlink transmission after repositioning the respective downlink transmission and/or removing one more sub-data packets of the respective downlink transmission,
wherein the method comprises invalidating the first downlink transmission or the second downlink transmission or at least the transmission of remaining sub-data packets of the respective downlink transmission, if the quality value of the respective downlink transmission falls below a predefined threshold.

44. Method according to claim 24,
wherein the method comprises distributing the first downlink transmission over the first base station and the second base station or a third base station in dependence on transmission conditions of the respective base station and/or transmission conditions between the respective base station and the end point.

45. Method according to claim 44,
wherein the method comprises estimating attenuations and/or delays of portions of the first downlink transmission transmitted by the respective base stations, and adapting transmit powers and/or delays of the respective base stations for transmitting the respective portions of the first downlink transmission based on the estimated attenuations and/or delays.

46. Method according to claim 24,
wherein the method comprises:
receiving the first downlink transmission from the first end point further with the second base station or a third base station of the wireless communication system,
determining a position of the first end point based on transmission characteristics of the first downlink transmission received at the first base station and the second base station or the third base station.

47. Method according to claim 46,
wherein the method comprises transmitting the first downlink transmission using beamforming based on the determined position of the first end point.

48. Method according to claim 24,
wherein the method comprises determining a position of the first end point based on a position information transmitted with the first uplink transmission.

49. Non-transitory digital storage medium having a computer program stored thereon to perform the method for transmitting data in an uncoordinated wireless communication system communicating in a radio band used by a plurality of communication systems, the method comprising:
transmitting a first uplink transmission between a first end point and a first base station of the wireless communication system,
transmitting a second uplink transmission between a second end point and the first base station or a second base station of the wireless communication system,
transmitting, in response to the transmission of the first uplink transmission, a first downlink transmission between the first base station and the first end point of the wireless communication system in a first downlink transmission window,
transmitting, in response to the transmission of the second uplink transmission, a second downlink transmission between the first base station or the second base station and the second end point of the wireless communication system in a second downlink transmission window, and
repositioning, in case of an expected collision of the first downlink transmission and the second downlink transmission, one or both of the first downlink transmission and the second downlink transmission in time and/or frequency within the respective downlink transmission window, in order to avoid a collision of the first downlink transmission and the second downlink transmission,
when said computer program is run by a computer.

* * * * *